United States Patent
Iguchi et al.

(10) Patent No.: US 12,475,554 B2
(45) Date of Patent: Nov. 18, 2025

(54) REMOVING AN IMAGE DEFECT OCCURING IN A MEDICAL IMAGE BEFORE EXAMINATION BASED ON THE GENERATION TIME POINT

(71) Applicant: TERUMO KABUSHIKI KAISHA, Tokyo (JP)

(72) Inventors: Akira Iguchi, Mishima (JP); Yusuke Seki, Tokyo (JP); Yuki Sakaguchi, Isehara (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 552 days.

(21) Appl. No.: 17/935,737

(22) Filed: Sep. 27, 2022

(65) Prior Publication Data

US 2023/0017227 A1    Jan. 19, 2023

Related U.S. Application Data

(63) Continuation of application No. PCT/JP2021/009230, filed on Mar. 9, 2021.

(30) Foreign Application Priority Data

Mar. 27, 2020 (JP) ................. 2020-058991

(51) Int. Cl.
*G06T 7/00* (2017.01)
*G06T 5/77* (2024.01)
(Continued)

(52) U.S. Cl.
CPC .............. *G06T 7/0012* (2013.01); *G06T 5/77* (2024.01); *G06T 7/70* (2017.01); *G06V 10/25* (2022.01);
(Continued)

(58) Field of Classification Search
CPC   G06T 7/0012; G06T 5/77; G06T 7/70; G06T 2207/10121; G06T 2207/20081;
(Continued)

(56) References Cited

U.S. PATENT DOCUMENTS

2013/0121556 A1    5/2013   Matsumoto
2015/0164342 A1*   6/2015   Choi ...................... A61B 6/504
                                                                    600/407

(Continued)

FOREIGN PATENT DOCUMENTS

JP    2010172434 A    8/2010
JP    2013102851 A    5/2013
JP    2017503561 A    2/2017

OTHER PUBLICATIONS

International Search Report (PCT/ISA/210) and Written Opinion (PCT/ISA/237) mailed on May 11, 2021, by the Japanese Patent Office as the International Searching Authority for International Application No. PCT/JP2021/009230 (13 pages).

*Primary Examiner* — Christopher Wait

(74) *Attorney, Agent, or Firm* — Buchanan Ingersoll & Rooney PC

(57) ABSTRACT

A non-transitory computer-readable medium storing computer program code executed by a computer processor that executes an imaging process comprising: acquiring a medical image generated based on a signal detected by a catheter insertable into a body lumen; estimating a cause of an image defect by inputting the acquired medical image to a model learned to output the cause of the image defect when the medical image in which the image defect occurs is input; and outputting introduction information for introducing a countermeasure for removing the estimated cause of the image defect.

11 Claims, 20 Drawing Sheets

(51) Int. Cl.
*G06T 7/70* (2017.01)
*G06V 10/25* (2022.01)
*G06V 10/98* (2022.01)

(52) U.S. Cl.
CPC .... *G06V 10/98* (2022.01); *G06T 2207/10121* (2013.01); *G06T 2207/20081* (2013.01); *G06T 2207/30021* (2013.01); *G06V 2201/07* (2022.01)

(58) Field of Classification Search
CPC . G06T 2207/30021; G06T 2207/10068; G06T 2207/20084; G06T 2207/30168; G06V 10/25; G06V 10/98; G06V 2201/07; A61B 1/00; A61B 1/045; A61B 8/12
See application file for complete search history.

(56) References Cited

U.S. PATENT DOCUMENTS

| | | | |
|---|---|---|---|
| 2015/0164451 A1* | 6/2015 | Choi | A61B 5/02007 600/407 |
| 2020/0258215 A1* | 8/2020 | Kashyap | G06V 10/82 |

* cited by examiner

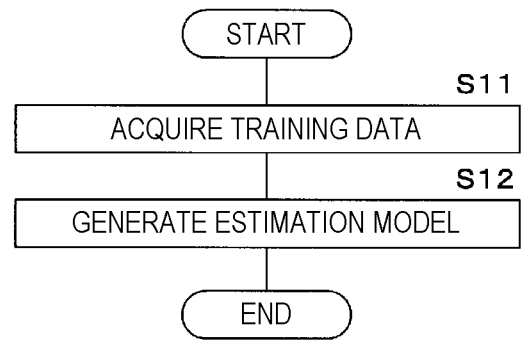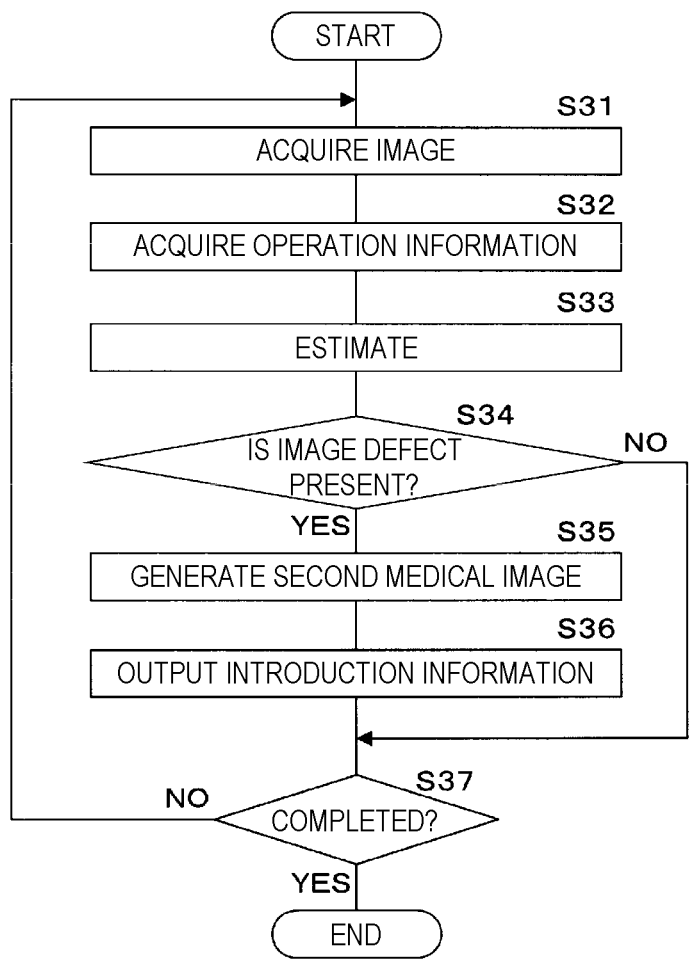

REMOVING AN IMAGE DEFECT OCCURING IN A MEDICAL IMAGE BEFORE EXAMINATION BASED ON THE GENERATION TIME POINT

CROSS-REFERENCES TO RELATED APPLICATIONS

This application is a continuation of International Application No. PCT/JP2021/009230 filed on Mar. 9, 2021, which claims priority to Japanese Application No. 2020-058991 filed on Mar. 27, 2020, the entire content of both of which is incorporated herein by reference.

TECHNOLOGICAL FIELD

The present disclosure generally relates to a program, an information processing method, an information processing apparatus, and a model generation method.

BACKGROUND DISCUSSION

A medical diagnostic imaging apparatus that images an inside of a human body, such as an ultrasound diagnostic apparatus, an X-ray photography apparatus, and an X-ray CT apparatus, has been widely used, and a method for detecting a failure, a breakage, or the like of the diagnostic imaging apparatus has been proposed. For example, Japanese Patent Application Publication No. 2010-172434A discloses a medical imaging apparatus failure diagnosis support apparatus that compares a medical image obtained from a medical imaging apparatus with a typical image in which an abnormal phenomenon occurs due to a failure of the apparatus, and displays a corresponding case when the abnormal phenomenon occurs.

However, the disclosure according to Japanese Patent Application Publication No. 2010-172434 A detects the abnormality simply by pattern matching with the typical image, and is not necessarily accurate.

SUMMARY

A non-transitory computer-readable program is disclosed that is capable of suitably removing a cause of an image defect occurring in a medical image.

A non-transitory computer-readable medium (CRM) storing computer program code executed by a computer processor that executes a process comprising: acquiring a medical image generated based on a signal detected by a catheter insertable into a body lumen; estimating a cause of an image defect by inputting the acquired medical image to a model learned to output the cause of the image defect when the medical image in which the image defect occurs is input; and outputting introduction information for introducing a countermeasure for removing the estimated cause of the image defect.

An information processing apparatus is discloses comprising: an acquisition unit configured to acquire a medical image generated based on a signal detected by a catheter insertable into a body lumen; an estimation unit configured to estimate a cause of an image defect by inputting the acquired medical image to a model learned to output the cause of the image defect when the medical image in which the image defect occurs is input; and an output unit configured to output introduction information for introducing a countermeasure for removing the estimated cause of the image defect.

A model generation method executed by a computer processor is disclosed, the method comprising: acquiring training data in which data indicating a cause of an image defect is given to a medical image that is generated based on a signal detected by a catheter insertable into a body lumen and in which the image defect occurs; and generating, based on the training data, a learned model configured to output the cause of the image defect when the medical image in which the image defect occurs is input.

In one aspect, the cause of the image defect occurring in the medical image can be suitably removed.

BRIEF DESCRIPTION OF THE DRAWINGS

FIG. 7 is a flowchart showing a procedure for generating the estimation model.
FIG. 8 is a flowchart showing a procedure for estimating an image defect.

DETAILED DESCRIPTION

Set forth below with reference to the accompanying drawings is a detailed description of embodiments of a program, an information processing method, an information processing apparatus, and a model generation method. Note that since embodiments described below are preferred specific examples of the present disclosure, although various technically preferable limitations are given, the scope of the present disclosure is not limited to the embodiments unless otherwise specified in the following descriptions.

First Embodiment

Figure 1:
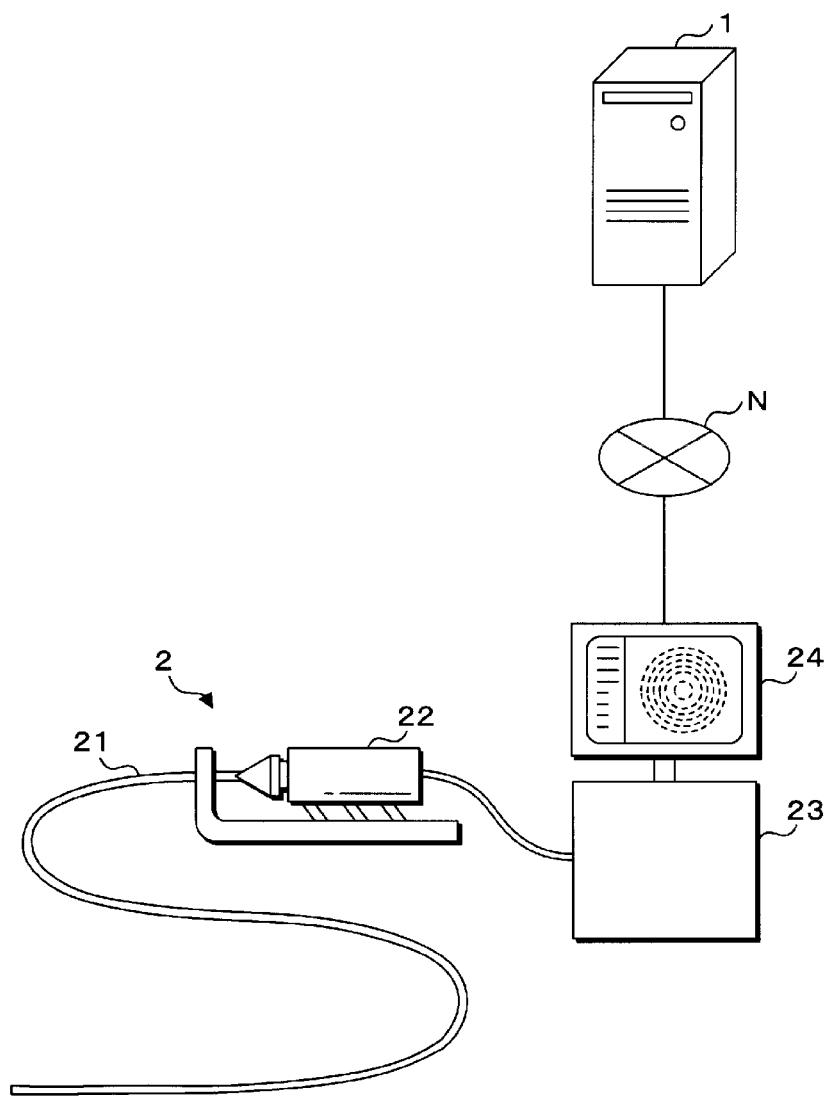
FIG. 1 is an explanatory diagram showing a configuration example of an image diagnosis system.

FIG. 1 is an explanatory diagram showing a configuration example of an image diagnosis system. In the present embodiment, an image diagnosis system will be described in which presence or absence and a cause of an image defect caused by inappropriate use, breakage, failure, or the like of a diagnostic imaging apparatus 2 are estimated based on a medical image acquired from the diagnostic imaging apparatus 2, and a countermeasure for removing the cause of the image defect is presented to a user (health care worker). The image diagnosis system includes an information processing apparatus 1 and the diagnostic imaging apparatus 2. The information processing apparatus 1 and the diagnostic imaging apparatus 2 are communicably connected to each other via a network N such as a local area network (LAN) or the Internet.

The diagnostic imaging apparatus 2 is an apparatus unit for imaging an inside of a body lumen of a subject, and is an apparatus unit for performing an ultrasound examination in a blood vessel of the subject using, for example, a catheter 21. The diagnostic imaging apparatus 2 can include the catheter 21, a motor drive unit (MDU) 22, an image processing apparatus 23, and a display apparatus 24. The catheter 21 is a medical instrument to be inserted into a blood vessel of a subject, and includes an imaging core that transmits an ultrasound based on a pulse signal and receives a reflected wave from an inside of the blood vessel. The diagnostic imaging apparatus 2 generates a tomographic image (medical image) of the inside of the blood vessel based on a signal of the reflected wave received by the catheter 21. The MDU 22 is a drive apparatus to which the catheter 21 is detachably attached, and controls motions of the imaging core of the catheter 21 in the blood vessel in a longitudinal direction and a rotational direction by driving a built-in motor in accordance with an operation of the user. The image processing apparatus 23 is a processing apparatus that processes data of the reflected wave received by the catheter 21 to generate the tomographic image, and includes an input interface for displaying the generated tomographic image on the display apparatus 24 and receiving input of various setting values at a time of examination.

Note that in the present embodiment, an intravascular examination is described as an example. However, the body lumen to be examined is not limited to the blood vessel, and may be, for example, an organ such as a bowel. The medical image is not limited to an ultrasound image, and may be, for example, an optical coherence tomography (OCT) image.

The information processing apparatus 1 is an information processing apparatus capable of performing various types of information processing and transmission and reception of information, and can be, for example, a server computer, or a personal computer. In the present embodiment, the information processing apparatus 1 is a server computer, and is hereinafter referred to as a server 1 for sake of simplicity. Note that the server 1 may be a local server installed in the same facility (hospital or the like) as the diagnostic imaging apparatus 2, or may be a cloud server communicably connected to the diagnostic imaging apparatus 2 via the Internet or the like. The server 1 functions as an estimation apparatus that estimates the presence or absence and the cause of image defect based on the medical image generated by the diagnostic imaging apparatus 2, and provides an estimation result to the diagnostic imaging apparatus 2. Specifically, as will be described later, the server 1 performs machine learning for learning training data, and prepares in advance an estimation model 141 (see FIG. 4) that outputs the estimation result obtained by estimating the presence or absence and the cause of image defect in the medical image using the medical image as an input. The server 1 acquires the medical image from the diagnostic imaging apparatus 2, inputs the medical image to the estimation model 141, and estimates the presence or absence and the cause of image defect. When it is estimated that the image defect is present, the server 1 outputs introduction information for introducing a countermeasure for removing the cause of the image defect to the diagnostic imaging apparatus 2 and causes the diagnostic imaging apparatus 2 to display the introduction information.

Note that in the present embodiment, the image defect is estimated in the server 1 separate from the image diagnostic apparatus 2, and the estimation model 141 generated by the machine learning by the server 1 may be installed in the image diagnostic apparatus 2 (the image processing apparatus 23) and the image defect may be estimated by the diagnostic imaging apparatus 2.

Figure 2:
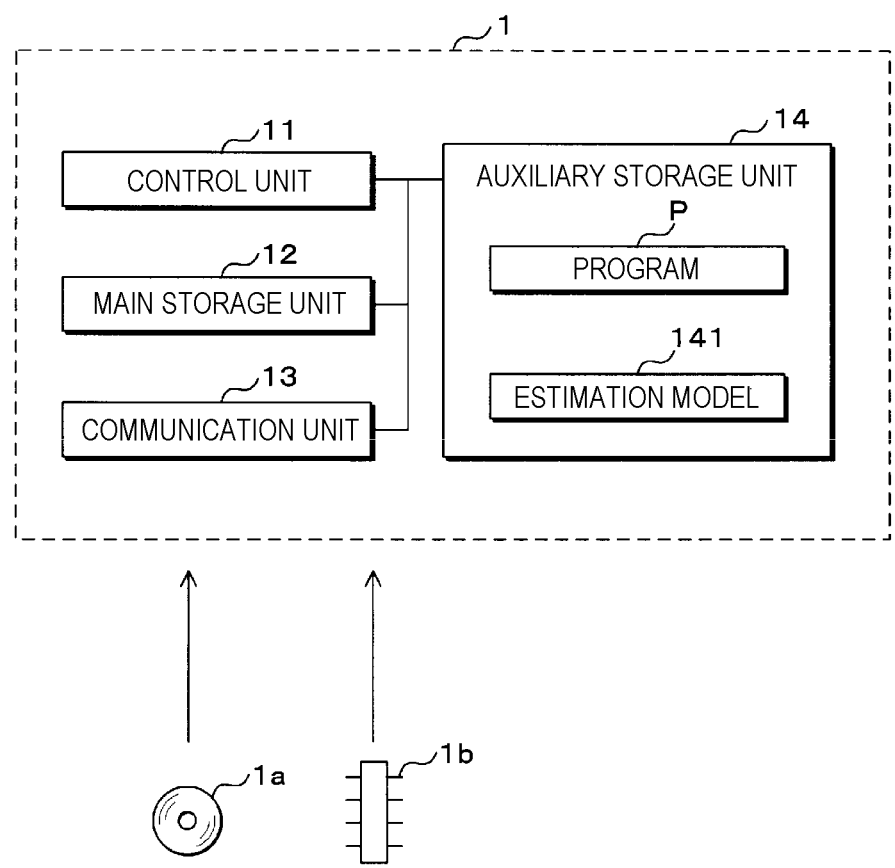
FIG. 2 is a block diagram showing a configuration example of a server.

FIG. 2 is a block diagram showing a configuration example of the server 1. The server 1 can include a control unit 11, a main storage unit 12, a communication unit 13, and an auxiliary storage unit 14.

The control unit 11 includes one or more arithmetic processing apparatuses such as a central processing unit (CPU), a micro-processing unit (MPU), and a graphics processing unit (GPU), and performs various types of information processing, control processing, and the like by reading and executing a program P stored in the auxiliary storage unit 14. The main storage unit 12 is a temporary storage area such as a static random-access memory (SRAM), a dynamic random-access memory (DRAM), or a flash memory, and temporarily stores data necessary for the control unit 11 to perform arithmetic processing. The communication unit 13 is a communication module for performing processing related to communication, and performs transmission and reception of information to and from an outside.

The auxiliary storage unit 14 can be a nonvolatile storage area such as a large-capacity memory or a hard disk, and stores the program P which is necessary for the control unit 11 to perform processing and other data. In addition, the auxiliary storage unit 14 stores the estimation model 141. The estimation model 141 is a machine learning model in which the training data is learned as described above, and is a model that outputs the estimation result obtained by estimating the presence or absence and the cause of image defect using the medical image as the input. The estimation model 141 can be used as a program module constituting artificial intelligence software.

Note that the auxiliary storage unit 14 may be an external storage apparatus connected to the server 1. The server 1 may be a multi-computer including a plurality of computers, or may be a virtual machine virtually constructed by software.

In the present embodiment, the server 1 is not limited to the above-described configuration, and may include, for example, an input unit that receives an operation input, a display unit that displays an image, and the like. The server 1 may include a reading unit that reads a portable storage medium 1a such as a compact disc (CD)-ROM or a digital versatile disc (DVD)-ROM, and may read and perform the program P from the portable storage medium 1*a*. Alternatively, the server 1 may read the program P from a semiconductor memory 1*b*.

Figure 3:
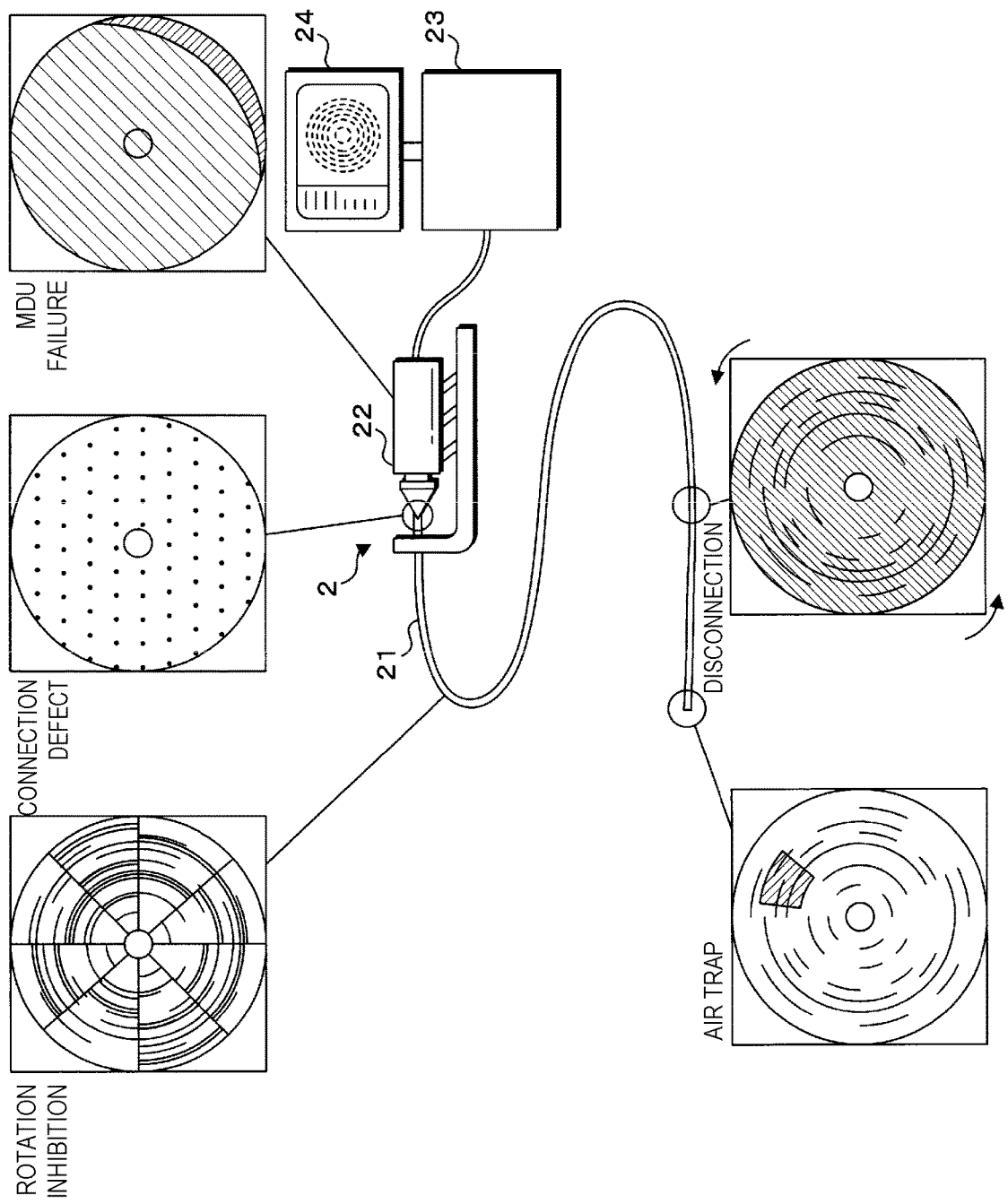
FIG. 3 is an explanatory diagram of an image defect occurring in a diagnostic imaging apparatus.

FIG. 3 is an explanatory diagram of the image defect occurring in the diagnostic imaging apparatus 2. The image defect to be estimated in the present embodiment will be described with reference to FIG. 3.

In the medical image imaged by the diagnostic imaging apparatus 2, various image defects may occur due to the inappropriate use, the breakage, the failure, or the like of the diagnostic imaging apparatus 2. In FIG. 3, representative image defects that occur in the diagnostic imaging apparatus 2 are shown in comparison with causes of the image defects.

Examples of the cause of the image defect can include trapped air, disconnection of a drive shaft inside the catheter 21, rotation inhibition of the drive shaft inside the catheter 21, connection defect between the catheter 21 and the MDU 22, and failure of the MDU 22. The image defect caused by the trapped air can be caused by air bubbles remaining in the trapped air at a distal end of the catheter 21. When the air bubbles of the trapped air are not sufficiently removed by priming before the examination, the ultrasound is attenuated by the air bubbles, and a part of the image or the whole image becomes dark. Air bubbles in a transducer at the distal end of the catheter 21 causes a phenomenon that a dark part of the image rotates in accordance with rotation of the drive shaft. Note that in FIG. 3, for sake of convenience, a state in which a part of the image is dark is shown by hatching.

When the drive shaft of the catheter 21 is disconnected, the entire image becomes dark, and ring-down in the vicinity of the center (a white ring-shaped image appearing in the vicinity of a center of the image) disappears. A sign of disconnection causes a phenomenon such as rotation of the image itself or non-uniformed rotational distortion (NURD), which means a distortion of the image due to a rotation defect. There are various reasons for the disconnection, and for example, when the catheter 21 is inserted into a stenosed site (a portion narrowed by a plaque) in the blood vessel, a kink (bending, twisting, crushing, or the like) of the drive shaft occurs. Disconnection may occur when the catheter 21 is forcibly moved back and forth in a state in which the kink of the drive shaft occurs.

When the rotation of the drive shaft of the catheter 21 is inhibited, a pattern such as a mosaic pattern or a scale pattern can be generated in the image. This phenomenon occurs due to twisting of the drive shaft, and if the drive shaft continues to be used in the twisted state, the rotation is inhibited, and the image defect occurs.

Connection defect between the catheter 21 and the MDU 22 causes a phenomenon that the image becomes dark, or a radial or storm-like image appears. In addition, failure of the MDU 22 (for example, a defect of an encoder or a deviation of a ferrite core) causes a phenomenon that the entire image becomes dark or a luminance of a part of the image (a hatched portion shown at a lower right end in FIG. 3) becomes relatively high.

In the present embodiment, the server 1 can estimate the presence or absence and the cause (type) of the image defect based on the medical image. Then, the server 1 outputs the introduction information for introducing the user to take the countermeasure for removing the cause of the image defect. Note that the image defect and the cause of the image defect are merely examples, and are not limited to the examples that are disclosed.

Figure 4:
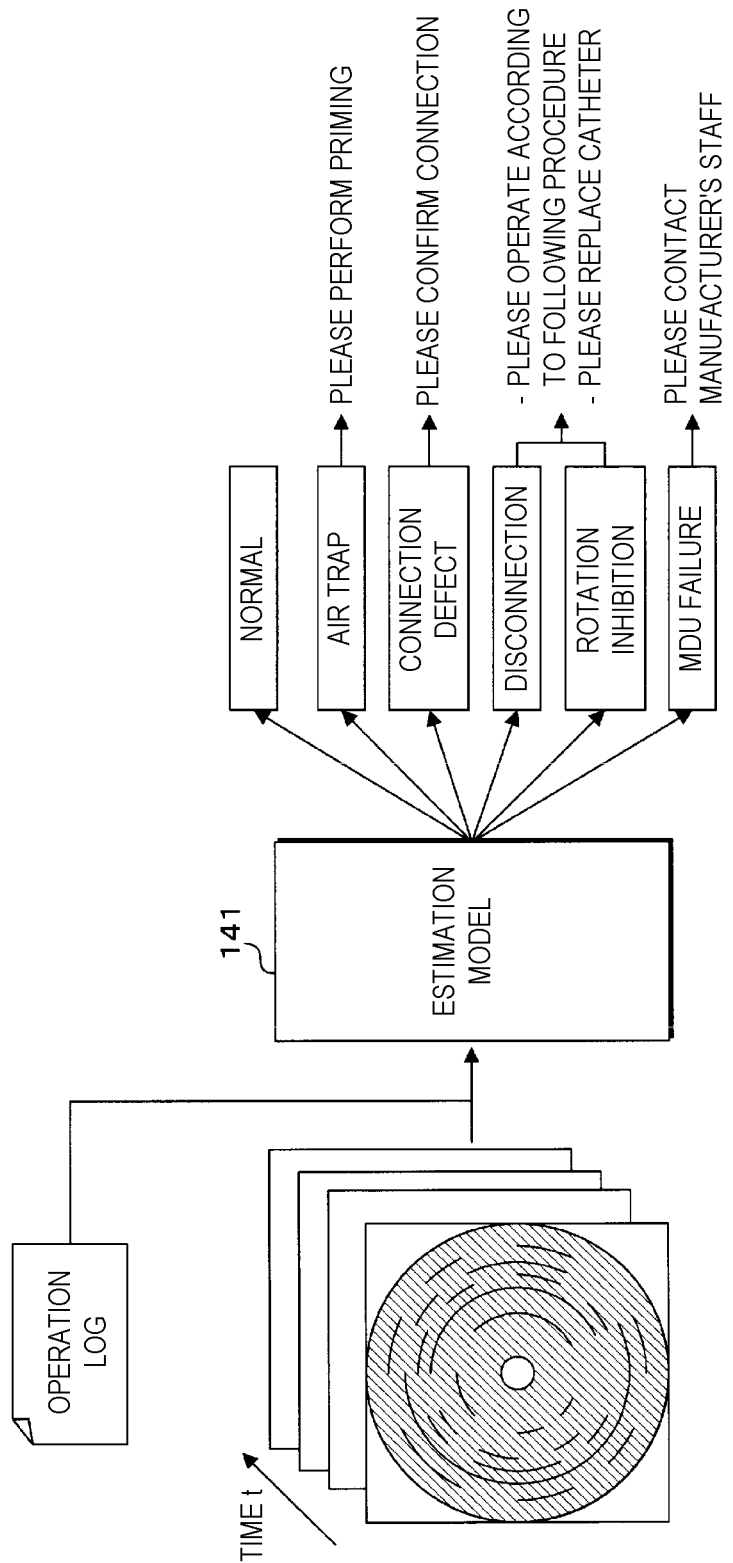
FIG. 4 is an explanatory diagram of an estimation model.

FIG. 4 is an explanatory diagram of the estimation model 141. The estimation model 141 is the machine learning model that outputs the estimation result obtained by estimating the cause of the image defect when receiving the medical image in which the image defect occurs. The server 1 performs the machine learning for learning the predetermined training data to generate the estimation model 141 in advance, acquires the medical image from the diagnostic imaging apparatus 2, and inputs the medical image to the estimation model 141 to estimate the presence or absence and the cause of image defect. The estimation model 141 will be described with reference to FIG. 4.

Note that as will be described later, the medical image input to the estimation model 141 may be an image during the examination in a state in which the catheter 21 is inserted into a blood vessel (body lumen) of a subject, or may be a test image before the examination. The estimation of the image defect before and during the examination and the introduction of the image defect before and during the examination will be described in detail later.

The estimation model 141 can be, for example, a neural network model generated by deep learning, and can be a convolutional neural network (CNN) that extracts feature data of an input image in multiple convolution layers. The estimation model 141 can include an intermediate layer (hidden layer) in which convolution layers in which pixel information on the input image is convoluted and pooling layers in which the convoluted pixel information is mapped are alternately connected, and extracts the feature data (feature data map) of the input image.

Note that although the estimation model 141 is described as the CNN in the present embodiment, the estimation model 141 may be a model based on other learning algorithms such as a generative adversarial network (GAN), a recurrent neural network (RNN), a support vector machine (SVM), and a decision tree.

The server 1 performs learning using the training data in which a medical image for training is labeled with data indicating the presence or absence of the image defect in the medical image and the cause of the image defect if the image defect is present. Specifically, each medical image for training is given with a label (metadata) of "normal" indicating that the image is normal, or "air trap", "connection defect", "disconnection", "rotation inhibition", or "MDU failure" indicating the cause of the image defect. The server 1 gives the training data to the estimation model 141 to perform learning.

Note that in the present embodiment, a normal medical image is learned as the training data. However, a medical image in which an image defect occurs may be learned alone without normal medical images being included in the training data. In this case, the server 1 may comprehensively determine probability values of occurrence of the image defects, and estimate, for example, that the medical image is normal when the probability values of all the image defects are equal to or less than a threshold (for example, 70% or less). Alternatively, the user may visually determine the presence or absence of an image defect, and when it is determined that an image defect is present, the user may transmit the image to the server 1 to cause the server 1 to estimate the cause of the image defect. In this way, the estimation model 141 only needs to be able to estimate the cause of the image defect at least when receiving a medical image in which an image defect occurs, and a configuration of estimating the presence or absence of image defect is not essential.

The server 1 inputs the tomographic image for training to the estimation model 141, and acquires the estimation result obtained by estimating the presence or absence and the cause of image defect as an output. Specifically, the probability value corresponding to each label such as "normal" or "air trap" is acquired as the output. Note that the output from the estimation model 141 may not be the probability value, and may be a value obtained by determining whether the image corresponds to each label or not using a binary value ("0" or "1").

The server 1 compares the estimation result output from the estimation model 141 with a correct value of the training data, and updates a parameter such as a weight between neurons such that the estimation result and the correct value are approximate to each other. The server 1 sequentially inputs the medical images for training to the estimation model 141 to update the parameter, and finally generates the estimation model 141.

In the present embodiment, the estimation model 141 receives the medical images (moving images) of a plurality of consecutive frames in a time series as the input, and estimates the presence or absence and the cause of image defect based on the medical images of the plurality of frames. Specifically, the estimation model 141 receives, as the input, the medical images of the plurality of consecutive frames along the longitudinal direction of the blood vessel in accordance with scanning of the catheter 21. The estimation model 141 estimates the presence or absence and the cause of image defect based on the medical images of the plurality of consecutive frames along a time axis t.

Note that in the following description, for sake of convenience, the medical images of the consecutive frames are simply referred to as "frame images".

The server 1 may input the frame images to the estimation model 141 one by one to perform the processing, but it is preferable to input the plurality of continuous frame images at the same time to perform the estimation. For example, the server 1 can set the estimation model 141 to a 3D-CNN (for example, C3D) that handles three-dimensional input data. Then, the server 1 treats the frame images as three-dimensional data in which coordinates of the two-dimensional frame images are set as two axes and the time t at which the frame images are acquired is set as one axis. The server 1 inputs a plurality of frame images (for example, 16 frames) for a predetermined unit time as one set to the estimation model 141, and outputs a single estimation result (probability value of each label) based on the plurality of frame images. Accordingly, the estimation can be performed in consideration of the consecutive preceding and following frame images in the time series, and an estimation accuracy can be improved.

Note that in the above description, the time series frame images can be processed by treating the frame images as the three-dimensional data including the time axis, but the present embodiment is not limited to the treating the frame images as the three-dimensional data including the time axis. For example, the server 1 may estimate the image defect based on the plurality of consecutive frame images by using a model obtained by combining the CNN and the RNN as the estimation model 141. In this case, for example, a long-short term memory (LSTM) layer is inserted after the intermediate layer of the CNN, and the estimation is performed based on the feature data extracted from the plurality of frame images. Also in this case, a detection accuracy can be improved in consideration of the plurality of consecutive frame images in the same manner as described above.

Furthermore, in the present embodiment, as the input to the estimation model 141, operation information on the diagnostic imaging apparatus 2 when the medical image is generated is used as the input in addition to the medical image. The operation information can be a log indicating an operation status of the diagnostic imaging apparatus 2 by the user, and is data capable of identifying an examination status of the subject using the diagnostic imaging apparatus 2.

Specifically, the server 1 determines, based on the operation information at the generation time point of the medical image, whether the time point is before the examination or during the examination (or after the examination). Then, the server 1 inputs the determination result as to whether the time point is before or during the examination to the estimation model 141 together with the medical image corresponding to the time point. Note that the phrase before the examination represents a state in which the catheter 21 is not inserted into the blood vessel of the subject (a test before the examination), and the phrase during the examination represents a state in which the catheter 21 is inserted into the blood vessel of the subject.

For example, the server 1 can input the binary data indicating whether the time point is before or during the examination to the estimation model 141 as a categorical variable indicating an attribute of the medical image. The training data can include the operation information as input data being correlated with the medical image, and the server 1 also can input the determination result before or during the examination determined based on the operation information to the estimation model 141 to perform the learning.

In general, depending on whether the examination is being performed in the diagnostic imaging apparatus 2, there are an image defect that is likely to occur during the examination and an image defect that occurs regardless of whether the examination is being performed. For example, an image defect caused by disconnection or a sign of disconnection, rotation inhibition, or the like is likely to occur during the examination, which means the catheter 21 is being operated. On the other hand, an image defect caused by air trap, connection defect, or the like occurs regardless of whether the examination is being performed, and thus is relatively easy to find even before the examination. Therefore, the estimation accuracy can be improved by causing the estimation model 141 to learn an examination status at a time of generating the medical image.

The server 1 learns the training data as described above to generate the estimation model 141. When the image defect is actually estimated, the server 1 acquires the medical image from the diagnostic imaging apparatus 2, inputs the medical image to the estimation model 141, and estimates the presence or absence and the cause of image defect. Note that the estimation of the image defect may be performed in real time at a time of examination, or the processing may be performed by acquiring the recorded medical image after the examination. In the present embodiment, for example, the processing is performed in real time at the time of examination.

The server 1 acquires the medical image from the diagnostic imaging apparatus 2 in real time and estimates the image defect. Then, when it is estimated that the image defect is present, the server 1 outputs the estimation result of the image defect and the introduction information for removing the estimated cause of the image defect to the diagnostic imaging apparatus 2.

Note that in the present embodiment, it is described that an output target of the introduction information is the diagnostic imaging apparatus 2, and obviously the introduction information may be output to an apparatus other than the diagnostic imaging apparatus 2 (for example, a personal computer).

The introduction information is information indicating the countermeasure for removing the cause of the image defect, and can be, for example, a message indicating an examination method (priming or the like) of the catheter 21, a correct operation method for avoiding the breakage of the catheter 21, necessity of component replacement, necessity of contact to a manufacturer, or the like. In the present embodiment, when the estimated cause of the image defect can be removed by the user per se, the server 1 outputs the introduction information for prompting an examination, an operation, or component replacement necessary for removing the cause. On the other hand, when the user per se cannot remove the cause of the image defect, the server 1 outputs the introduction information for prompting the user to contact the manufacturer or the like.

For example, when it is estimated that an image defect due to trapped air occurs, introduction information for prompting priming can be output. When it is estimated that connection defect occurs, introduction information for prompting confirmation of connection between the catheter 21 and the MDU 22 can be output. When it is estimated that breakage such as disconnection or a sign of disconnection of the catheter 21 or rotation inhibition is possible, introduction information for prompting correct operation for avoiding disconnection or the like or replacement of the catheter 21 can be output. In addition, when it is estimated that a failure occurs in the MDU 22, since the MDU 22 cannot be repaired by the user, introduction information for prompting the user to contact the manufacturer can be output.

Figure 5:
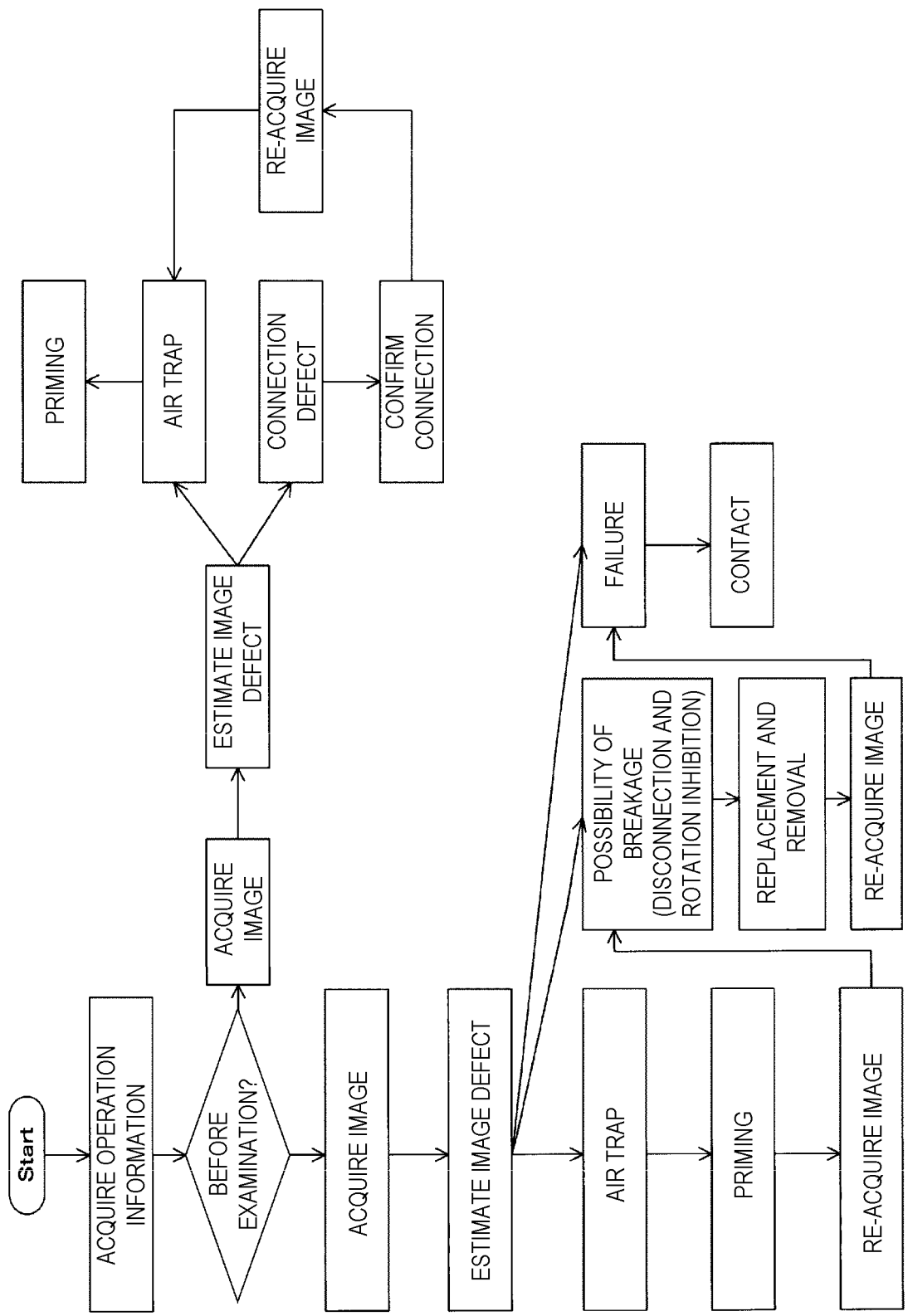
FIG. 5 is a flowchart showing a procedure for introducing an image defect.

FIG. 5 is a flowchart showing a procedure for introducing an image defect. FIG. 5 conceptually shows a procedure for estimating an image defect at the time of examination and introducing the cause of each image defect. The procedure for introducing an image defect will be described with reference to FIG. 5.

The server 1 acquires the operation information on the diagnostic imaging apparatus 2 at the time of examination. Then, the server 1 determines whether the current status is before the examination or during the examination based on the operation information. According to whether the current status is before the examination, the server 1 branches the processing as follows.

When it is determined that the current status is before the examination, the server 1 acquires the medical image before the examination (test image) from the diagnostic imaging apparatus 2, inputs the medical image to the estimation model 141, and estimates the presence or absence and the cause of image defect. Note that as described above, the server 1 inputs the determination result obtained by determining whether the current status is before the examination to the estimation model 141 together with the medical image.

The server 1 determines whether the predetermined image defect occurs based on the estimation result output from the estimation model 141. Specifically, the server 1 determines whether an image defect due to connection defect or trapped air occurs. Note that at a stage before the examination, it may be determined whether an image defect due to other causes such as disconnection occurs.

When it is determined that a predetermined image defect occurs, the server 1 outputs the introduction information according to the cause of the image defect. Specifically, when it is determined that an image defect due to trapped air occurs, the server 1 outputs the introduction information for prompting the priming. When it is determined that a connection defect between the catheter 21 and the MDU 22 occurs, the server 1 outputs the introduction information for prompting the confirmation of the connection between the catheter 21 and the MDU 22.

Note that when it is determined that a connection defect occurs, the server 1 reacquires a medical image obtained after connection confirmation from the diagnostic imaging apparatus 2, inputs the medical image to the estimation model 141, and re-estimates the image defect. As a result of the re-estimation, it can be determined whether an image defect due to trapped air occurs separately from the connection defect. When it can be determined that an image defect due to trapped air occurs, the server 1 outputs the introduction information for prompting the priming. In this way, when the server 1 outputs the introduction information, the server 1 reacquires a medical image obtained after the countermeasure indicated by the introduction information is performed, re-estimates the medical image, and determines whether an image defect due to another cause occurs. Accordingly, the user can examine the diagnostic imaging apparatus 2 in a suitable order.

When it is determined that the current status is during the examination, the server 1 acquires the medical image during the examination from the diagnostic imaging apparatus 2, inputs the medical image to the estimation model 141, and estimates the presence or absence and the cause of image defect. Then, based on the estimation result, the server 1 determines whether a predetermined image defect that is likely to occur during the examination occurs. Specifically, the server 1 can determine whether trapped air, a disconnection or a sign of disconnection of the catheter 21, a rotation inhibition, a failure of the MDU 22, or the like occurs.

When it is determined that an image defect due to trapped air occurs, the server 1 outputs the introduction information for prompting the priming. When it is determined that a sign of breakage of the catheter 21, such as disconnection, a sign of disconnection, or rotation inhibition is present, the server 1 outputs the introduction information for prompting the operation for avoiding the breakage of the catheter 21, the replacement of the catheter 21, acquisition of the image after removing the catheter 21, or the like. When it is determined that a failure occurs in the MDU 22, the server 1 outputs the introduction information for prompting the user to contact the manufacturer.

Note that during the examination, as in a case before the examination, the server 1 reacquires a medical image after the introduction information is output, and re-estimates the image defect. Specifically, as shown in FIG. 5, when it is determined that the image defect due to the trapped air occurs, the server 1 reacquires a medical image obtained after the priming is performed and re-estimates the image defect. As a result of the re-estimation, when it is estimated that breakage is possible, the server 1 outputs the introduction information, reacquires a medical image obtained after the countermeasure is performed, and re-estimates the image defect. As a result of the re-estimation, when it is determined that a failure occurs in the MDU 22, the server 1 outputs the introduction information for prompting replacement of the MDU 22.

In this way, the server 1 performs the estimation depending on whether the current status is before the examination or during the examination, and outputs the introduction information while repeating the reacquisition of the medical image and the re-estimation.

Figure 6:
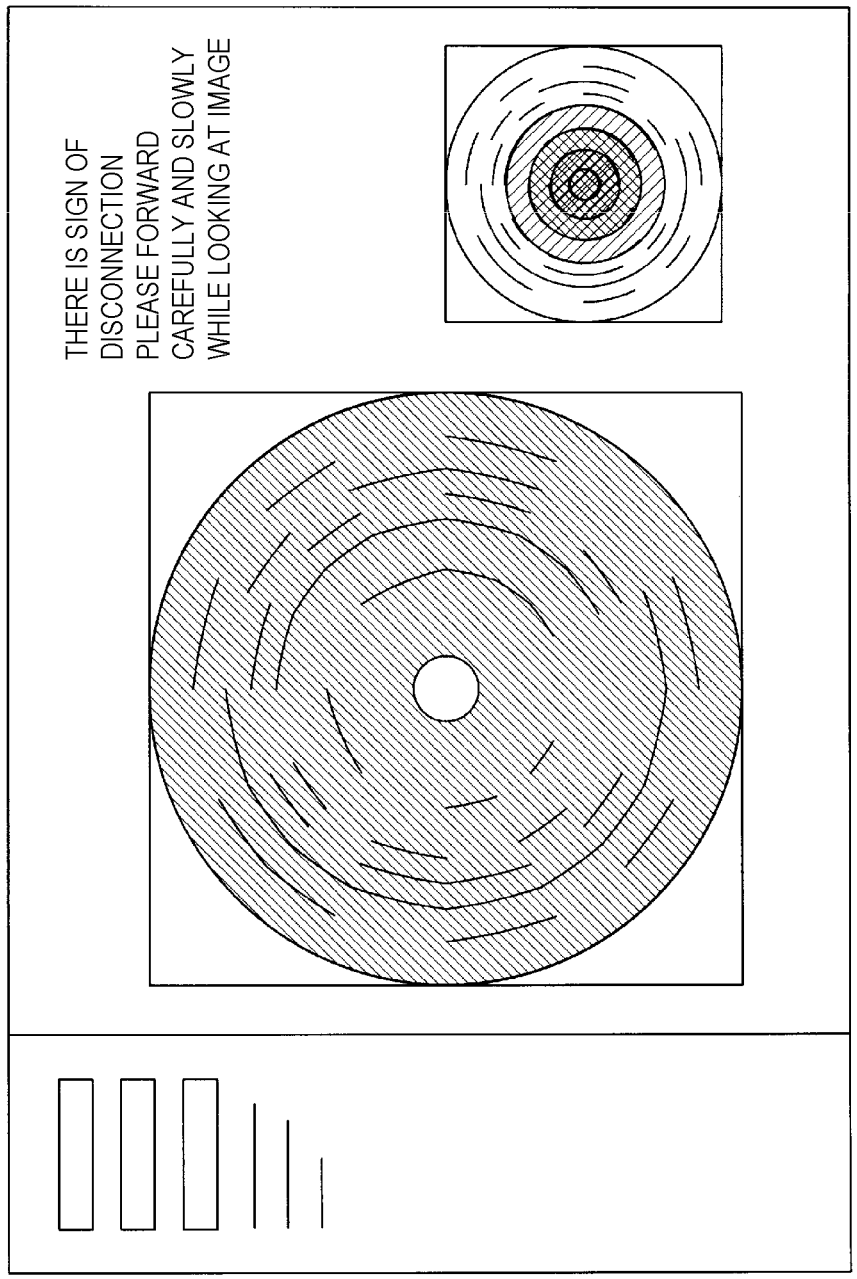
FIG. 6 is an explanatory diagram showing an example of a display screen of the diagnostic imaging apparatus.

FIG. 6 is an explanatory diagram showing an example of a display screen of the diagnostic imaging apparatus 2. FIG. 6 shows the example of the display screen in the diagnostic imaging apparatus 2 when an image defect occurs. FIG. 6 shows, for example, the display screen in a case in which a sign of breakage (for example, disconnection) is estimated during the examination.

As shown in FIG. 6, the diagnostic imaging apparatus 2 displays a medical image (tomographic image) obtained by imaging the inside of the blood vessel of the subject. When the server 1 estimates that an image defect is present, the diagnostic imaging apparatus 2 displays an alert of the estimation result related to the image defect in accordance with the output from the server 1.

The diagnostic imaging apparatus 2 displays the introduction information for introducing the countermeasure for removing the cause of the image defect. For example, when it is estimated that a sign of disconnection of the catheter 21 is present, the diagnostic imaging apparatus 2 introduces an operation method of the catheter 21 such that the user slowly pushes the catheter 21 forward while checking a display image. When the image defect is not eliminated by the operation, the diagnostic imaging apparatus 2 guides the user to replace the catheter 21.

In addition, as shown in FIG. 6, the server 1 may generate a second medical image in which a feature portion of the image serving as a basis of the estimation of the image defect is visualized, and cause the diagnostic imaging apparatus 2 to display the second medical image. The second medical image is an image indicating an image region referred to as the feature portion when the estimation model 141 estimates the image defect, and can be, for example, an image indicating the region in a heat map.

For example, the server 1 generates the second medical image using Grad-CAM method. Grad-CAM is a method of visualizing which part of the input image is captured as a feature in the CNN, and is a method of extracting an image part that greatly contributes to an output. In Grad-CAM, extraction is performed by regarding a part having a large gradient when the feature data is extracted in the intermediate layer of the CNN as the feature portion.

Specifically, the server 1 inputs an output value (probability value of each label) from an output layer of the estimation model 141 (CNN) and gradient data of the input to a last convolution layer in the intermediate layer to an activation function, and generates the heat map. The server 1 superimposes the generated heat map on an original medical image to generate the second medical image. As shown in a lower right side of FIG. 6, the server 1 displays the second medical image in parallel with the original medical image.

Note that although Grad-CAM is described above, the second medical image may be generated using another method such as Guided Grad-CAM. By displaying the second medical image, a basis for the estimation model 141 to determine the image defect can be presented to the user, and the user can check whether the determination is correct.

FIG. 7 is a flowchart showing a procedure for generating the estimation model 141. With reference to FIG. 7, a processing content when the training data is learned to generate the estimation model 141 will be described.

The control unit 11 of the server 1 acquires the training data in which the data indicating the presence or absence and the cause of image defect in the medical image is given to the medical image for training and the operation information (S11). Based on the training data, the control unit 11 generates the estimation model 141 that outputs the estimation result obtained by estimating the presence or absence and the cause of image defect when receiving the medical image (S12). For example, as described above, the control unit 11 generates a CNN model as the estimation model 141.

The control unit 11 inputs the medical image for training and the determination result of whether the current status is before the examination, which is determined based on the operation information, to the estimation model 141, and acquires the estimation result obtained by estimating the presence or absence and the cause of image defect as the output. The control unit 11 compares the estimation result with the correct value, and generates the estimation model 141 by optimizing the parameter such as a weight between neurons such that the estimation result and the correct value are approximate to each other. The control unit 11 ends the series of processing.

FIG. 8 is a flowchart showing a procedure for estimating an image defect. With reference to FIG. 8, a processing content when the presence or absence and the cause of image defect is estimated using the estimation model 141 and the introduction information for removing the cause is output will be described.

The control unit 11 of the server 1 acquires the medical image from the diagnostic imaging apparatus 2 (S31). Then, the control unit 11 acquires the operation information when the medical image is generated from the diagnostic imaging apparatus 2 (S32).

The control unit 11 inputs the acquired medical image and the determination result of whether the current status is before the examination, which is determined based on the operation information, to the estimation model 141, and estimates the presence or absence and the cause of image defect (S33). The control unit 11 determines whether the image defect is present based on the estimation result of S33 (S34). When it is determined that the image defect is present (YES in S34), the control unit 11 generates the second medical image indicating the feature portion in the medical image referred to when the image defect is estimated in the estimation model 141 (S35). The control unit 11 outputs, to the diagnostic imaging apparatus 2, the introduction information for introducing the countermeasure for removing the cause of the image defect together with the second medical image (S36).

When it is determined to be NO in S34 or after the processing of S36 is performed, the control unit 11 determines whether the examination by the diagnostic imaging apparatus 2 is completed (S37). When it is determined that the examination is not completed (NO in S37), the control unit 11 returns the processing to S31. When it is determined that the examination is completed (YES in S37), the control unit 11 ends the series of processing.

Note that although the case of displaying the estimation result of the image defect is displayed is described above, the server 1 may further receive an input for correcting the displayed estimation result of the image defect from the user and perform relearning based on the input information. Specifically, the server 1 receives the correction input indicating whether the image defect displayed as the estimation result actually occurs on the display screen shown in FIG. 5. Further, when the cause of the displayed image defect is different from an actual cause, the server 1 receives an input of the correct cause of the image defect. When the correction input is received, the server 1 performs the relearning using, as the training data, a medical image in which the corrected estimation result (the presence or absence and the cause of image defect) is labeled, and updates the estimation model 141. Accordingly, the estimation accuracy of the image defect can be improved through the operation of the present system.

In addition, although the estimation model 141 that is common between before and during the examination is used in the above description, the estimation model 141 obtained by learning the medical image before the examination and the estimation model 141 obtained by learning the medical image during the examination may be separately prepared, and different estimation models 141 may be used depending on whether the current status is before the examination. The estimation accuracy can be improved by preparing different models depending on whether the current status is before the examination.

As described above, according to the first embodiment, by using the estimation model 141 constructed by the machine learning, the presence or absence and the cause of image defect can be accurately estimated, and the cause of the image defect can be removed.

According to the first embodiment, the estimation accuracy can be improved by inputting the plurality of frame images into the estimation model 141 and simultaneously processing the frame images.

According to the first embodiment, by repeating the reacquisition and re-estimation of the image, whether the cause of each image defect occurs can be estimated in a suitable procedure, and the countermeasure can be introduced to the user.

In addition, according to the first embodiment, the sign of breakage of the catheter 21 can be detected from the medical image, and the user can be guided to perform a correct operation method for avoiding the breakage or to replace the components.

Second Embodiment

In the present embodiment, in addition to estimation of an image defect, an aspect in which an artifact in a medical image is detected and presented to a user will be described. Note that the same reference numerals are given to the same contents as those of the first embodiment, and description of the same reference numerals will be omitted.

Figure 9:
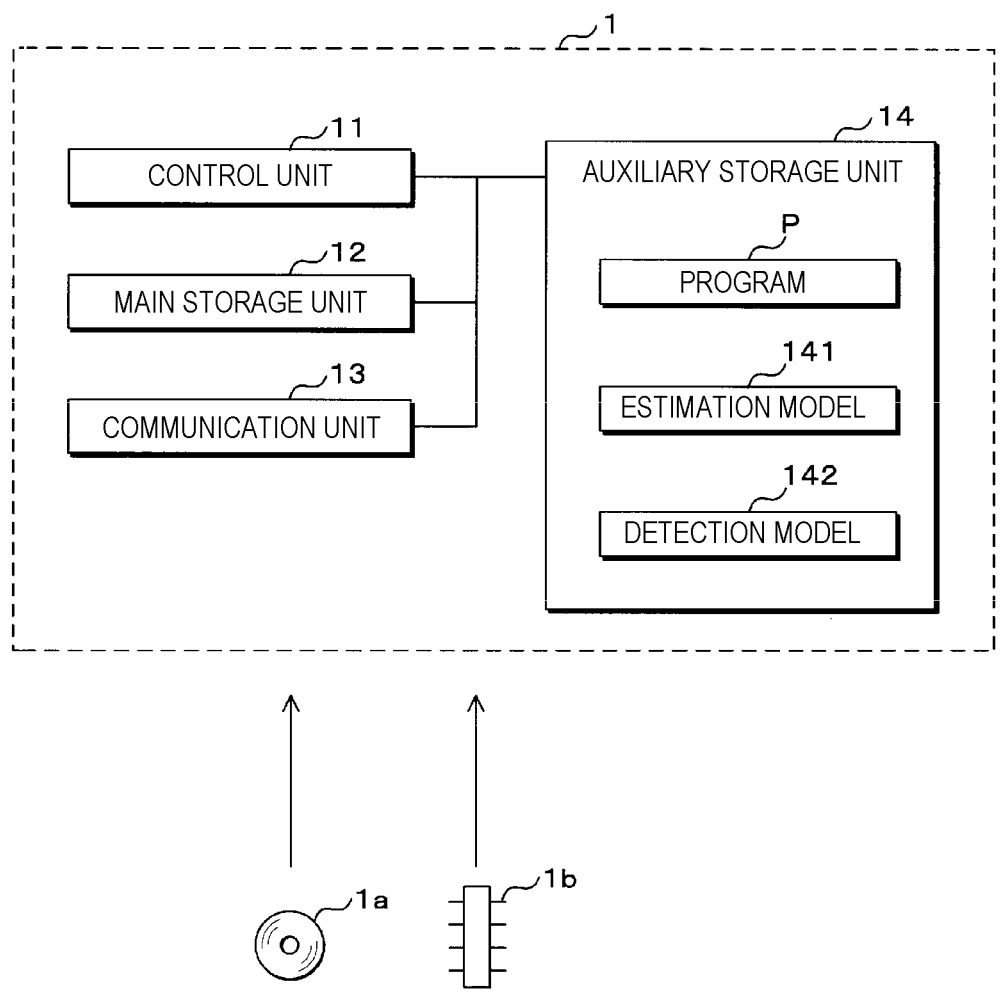
FIG. 9 is a block diagram showing a configuration example of a server according to a second embodiment.

FIG. 9 is a block diagram showing a configuration example of the server 1 according to the second embodiment. The auxiliary storage unit 14 of the server 1 according to the present embodiment stores a detection model 142 for artifact detection. Similarly, to the estimation model 141, the detection model 142 is a machine learning model in which training data is learned, and is a model that receives the medical image as an input and outputs a detection result obtained by detecting an image region corresponding to the artifact in the medical image. The detection model 142 is assumed to be used as a program module that functions as a part of artificial intelligence software.

Note that in the following description, for sake of convenience, the image region corresponding to the artifact in the medical image is referred to as an "artifact region".

Figure 10:
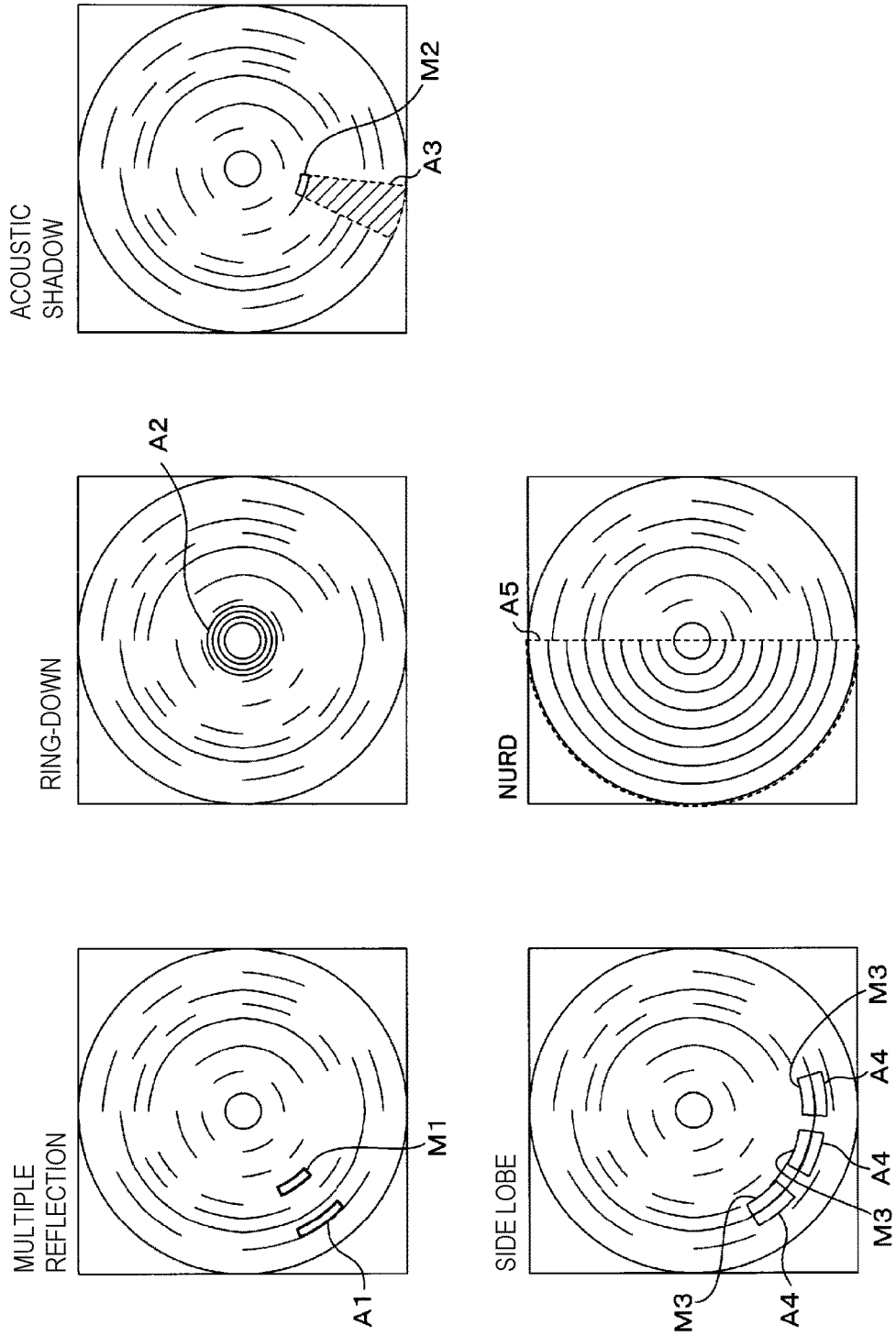
FIG. 10 is an explanatory diagram of artifacts.

FIG. 10 is an explanatory diagram of the artifact. FIG. 10 conceptually shows five types of artifacts occurring in the medical image.

The artifact is a virtual image that is not intended for an examination or that is not actually present, and is an image that is imaged due to an apparatus, an imaging condition, or the like. As shown in FIG. 10, examples of the artifact can include a multiple reflection (echo), a ring-down, an acoustic shadow, a side lobe, an NURD, and the like.

The multiple reflection is a virtual image generated by an ultrasound transmitted from the catheter 21 being reflected many times in a body lumen. The example of FIG. 10 shows a state in which the ultrasound is reflected by an object M1 (for example, a calcified tissue) in a blood vessel and an artifact A1 is generated. When a hard object M1 is present in the blood vessel, the artifact A1 is generated at a position at an equal interval to a distance between the object M1 and the catheter 21, and is projected as an image that is extremely similar to the object M1.

The ring-down is a ring-shaped image that appears near a center of an image due to the multiple reflection between an oscillator and a sheath. The example of FIG. 10 shows a state in which a ring-shaped artifact A2 appears at the center of the image. The ring-down is projected as a white ring having a constant width.

The acoustic shadow is a phenomenon that a part of the image fades away in black as the ultrasound is greatly attenuated in a process of being transmitted radially outward of the catheter 21. The example of FIG. 10 conceptually shows a state in which a region radially outward of the catheter 21 from the object M2 fades away in black as an artifact A3. Note that in FIG. 10, for convenience of illustration, the region that fades away in black is indicated by hatching. When a hard object M2 is present in the blood vessel, most of the ultrasounds are reflected by the object M2, and thus the ultrasound transmitted radially outward of the catheter 21 from the object M2 is greatly attenuated, so that the acoustic shadow is generated.

The side lobe is a weak ultrasound (sub pole) transmitted at a constant angle with respect to a main lobe (main pole) of the ultrasound transmitted with a constant directivity. Due to the side lobe, objects M3 (for example, a stent) in an actual blood vessel are projected as images larger than actual images. The example of FIG. 10 shows images caused by the side lobe as artifacts A4. When the catheter 21 simultaneously receives reflected waves from the objects M3 on the side lobe and a reflected wave from the main lobe, artifacts A4 are generated.

The NURD is a distortion of an image generated when a drive shaft of the catheter 21 does not normally rotate. The NURD occurs due to bending in the blood vessel, twisting of a shaft of the catheter 21, or the like. The example of FIG. 10 shows a part in which an image of a left half is distorted due to unevenness of a rotation speed as an artifact A5 surrounded by a broken line.

In the present embodiment, the server 1 detects the above-described various artifacts from the medical image. Specifically, as will be described below, the server 1 detects the artifact using the detection model 142 which has learned the artifact region in the medical image.

Note that the multiple reflection, the ring-down, and the like are examples of the artifacts, and the artifacts to be detected are not limited to the examples disclosed.

Figure 11:
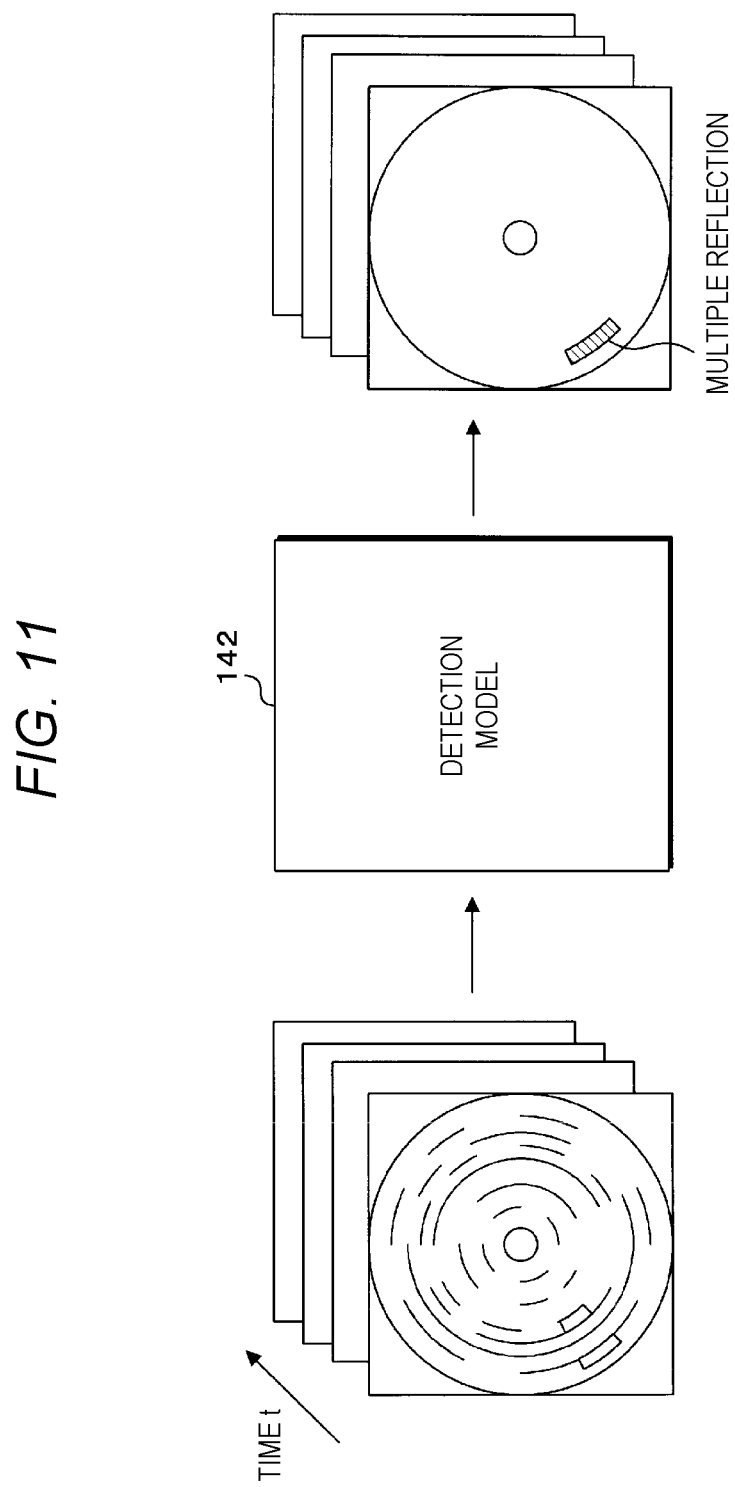
FIG. 11 is an explanatory diagram of a detection model.

FIG. 11 is an explanatory diagram of the detection model 142. The detection model 142 is a machine learning model that receives a medical image as input and outputs a detection result obtained by detecting an artifact region in the medical image. The server 1 learns the training data similarly to the estimation model 141 and generates the detection model 142 in advance. Then, the server 1 inputs the medical image acquired from the diagnostic imaging apparatus 2 to the detection model 142, and detects the artifact region in the medical image.

The detection model 142 can be, for example, a CNN, which includes an intermediate layer (hidden layer) in which convolution layers and pooling layers are alternately connected, and extracts feature data (feature data map) of an input image. Note that the detection model 142 is described as the CNN in the present embodiment, but may be a model based on other learning algorithms such as a GAN, an RNN, an SVM, and a decision tree.

In the present embodiment, the server 1 generates the detection model 142 for identifying, in units of pixels, whether each pixel in the input medical image is a pixel corresponding to the artifact region. For example, the server 1 generates a semantic segmentation model, a MASK region CNN (R-CNN), or the like as the detection model 142.

The semantic segmentation model is one type of the CNN, and is one type of an encoder decoder model that generates output data based on input data. The semantic segmentation model includes, in addition to the convolution layer for compressing data of the input image, a deconvolution layer for mapping (enlarging) feature data obtained by compression to an original image size. The deconvolution layer identifies which object is present at which position in the image based on the feature data extracted by the convolution layer, and generates a label image in which each pixel corresponds to which object is binarized.

The MASK R-CNN is a modification of Faster R-CNN mainly used for object detection, and has a configuration in which the deconvolution layer is connected to the Faster R-CNN. The MASK R-CNN inputs feature data of an image extracted by the CNN and information on a coordinate region of a target object extracted by a region proposal network (RPN) to the deconvolution layer, and finally generates a mask image obtained by masking the coordinate region of the object in the input image.

The server 1 generates these models as the detection model 142 and uses these models to detect the artifact. Note that the above-described models are merely examples, and the detection model 142 may be any model as long as it can identify a position and a shape of the artifact in the medical image. In the present embodiment, for example, the detection model 142 will be described as the semantic segmentation model.

The server 1 performs learning using the training data in which a medical image for training is labeled with data indicating the artifact region. Specifically, in the training data, a label indicating a coordinate range corresponding to the artifact region and a type of the artifact is given to the medical image for training.

The server 1 inputs the medical image for training to the detection model 142, and acquires a detection result obtained by detecting the artifact region as an output. Specifically, as shown by hatching on a right side of the detection model 142 in FIG. 11, a label image in which data indicating the type of the artifact is labeled is acquired as an output for each pixel corresponding to the artifact region.

The server 1 compares the detection result output from the detection model 142 with the coordinate range of the artifact region of the correct answer indicated by the training data and the type of artifact, and generates the detection model 142 by optimizing a parameter such as a weight between neurons such that the detection result and the correct answer are approximate to each other.

Note that as in the estimation model 141, it is preferable that the detection model 142 can perform estimation from a plurality of frame images that are continuous in time series. In this case, similarly to the estimation model 141, the detection model 142 may be a 3D-CNN (for example, 3D U-net) or a model obtained by combining the CNN and the RNN.

The server 1 learns the training data as described above and generates the detection model 142. When the medical image is acquired from the diagnostic imaging apparatus 2, the server 1 estimates an image defect using the estimation model 141, and inputs the medical image to the detection model 142 to detect the artifact region. When the server 1 detects the artifact region, the server 1 outputs the detection result to the diagnostic imaging apparatus 2.

Figure 12:
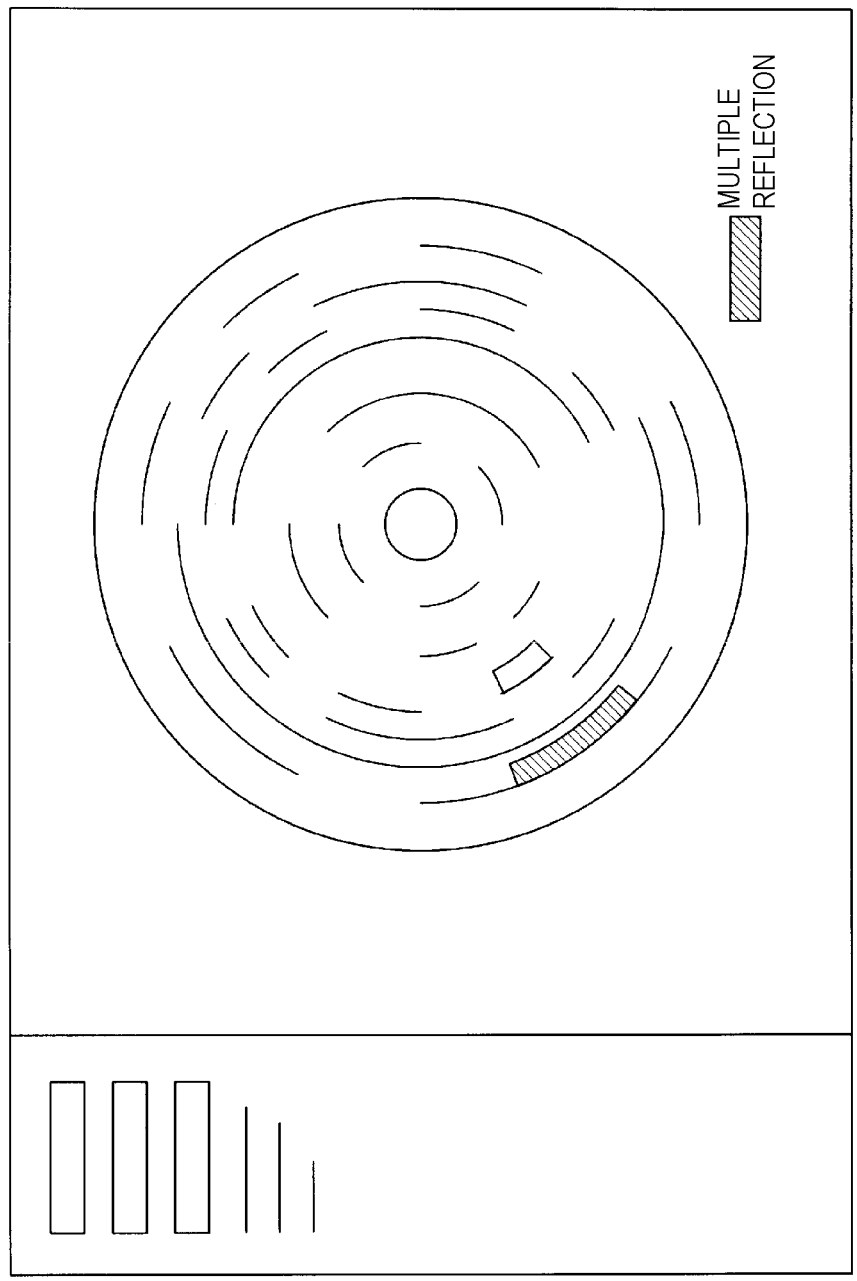
FIG. 12 is an explanatory diagram showing an example of a display screen of a diagnostic imaging apparatus according to the second embodiment.

FIG. 12 is an explanatory diagram showing an example of a display screen of the diagnostic imaging apparatus 2 according to the second embodiment. FIG. 12 shows an example of the display screen displayed by the diagnostic imaging apparatus 2 when an artifact is detected.

When an artifact region is detected by the server 1, the diagnostic imaging apparatus 2 displays the artifact region in association with the medical image. Specifically, as indicated by the hatching in FIG. 12, the diagnostic imaging apparatus 2 displays a third medical image indicating the detected artifact region in a display mode (for example, color display) different from that of the other image regions.

The third medical image can be a medical image obtained by processing the artifact region so as to be distinguishable from the other regions, and is an image obtained by superimposing the label image output from the detection model 142 on an original medical image. When the artifact region is detected, the server 1 generates the third medical image and outputs the third medical image to the diagnostic imaging apparatus 2. For example, the server 1 processes the label image into a translucent mask of a display color other than black and white, and generates the third medical image by superimposing the translucent mask on the artifact region of the medical image expressed in black and white.

In this case, the server 1 preferably changes the display mode (display color) according to the type of the artifact. Accordingly, the user can intuitively grasp various artifacts generated due to different causes, and convenience can be improved.

Note that although the artifact region is displayed in color in the above description, the present embodiment is not limited to the artifact region being displayed in color, and for example, a contour (edge) part of the artifact region may be highlighted. In this way, the display mode of the artifact region is not particularly limited as long as the artifact region can be displayed so as to be distinguishable from the other image regions.

The diagnostic imaging apparatus 2 displays the third medical image and notifies the user that the artifact occurs. A label name indicating the type of the artifact is displayed correlated with the display color (for example, a type of hatching in FIG. 12) of the artifact region.

Note that in the above description, the artifact region is detected in units of pixels, and the artifact region can be displayed in units of pixels, however, the present embodiment is not limited the artifact region being detected in units of pixels. For example, the artifact region may be simply surrounded by a bounding box (rectangular frame) and displayed. In this way, a configuration of detecting the artifact region in units of pixels is not essential, and any configuration may be used as long as a position corresponding to the artifact can be detected and displayed.

The example of FIG. 12 shows a case in which only the artifact is detected, and in a case in which an image defect is also estimated (detected) at the same time, the detection result of the artifact and an estimation basis of the image defect may be displayed on the medical image at the same time. In this case, for example, the server 1 may display, in a superimposed manner, the translucent mask corresponding to the artifact region and a heat map corresponding to the image defect on the same medical image.

Figure 13:
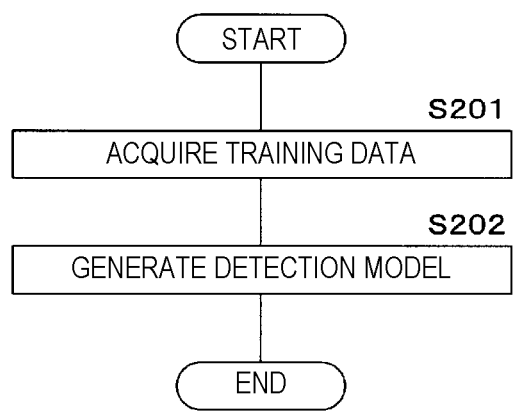
FIG. 13 is a flowchart showing a procedure for generating the detection model.

FIG. 13 is a flowchart showing a procedure for generating the detection model 142. With reference to FIG. 13, a processing content when the detection model 142 is generated by machine learning will be described.

The control unit 11 of the server 1 acquires the training data in which the medical image for training is labeled with the artifact region (S201). Specifically, as described above, the training data in which a label indicating the coordinate range of the artifact region and the type of the artifact is given to the medical image for training is acquired.

The control unit 11 generates, based on the training data, the detection model 142 that outputs the detection result obtained by detecting the artifact region and the type of the artifact when receiving the medical image (S202). Specifically, as described above, the control unit 11 generates, as the detection model 142, the semantic segmentation model for identifying an object in the medical image in units of pixels. The control unit 11 inputs the medical image for training to the detection model 142, and acquires, as an output, the detection result obtained by detecting the artifact region and the type of the artifact. The control unit 11 compares the detection result with a correct value (a correct label), and generates the detection model 142 by optimizing the parameter such as a weight between neurons such that the detection result and the correct answer value are approximate to each other. The control unit 11 ends the series of processing.

Figure 14:
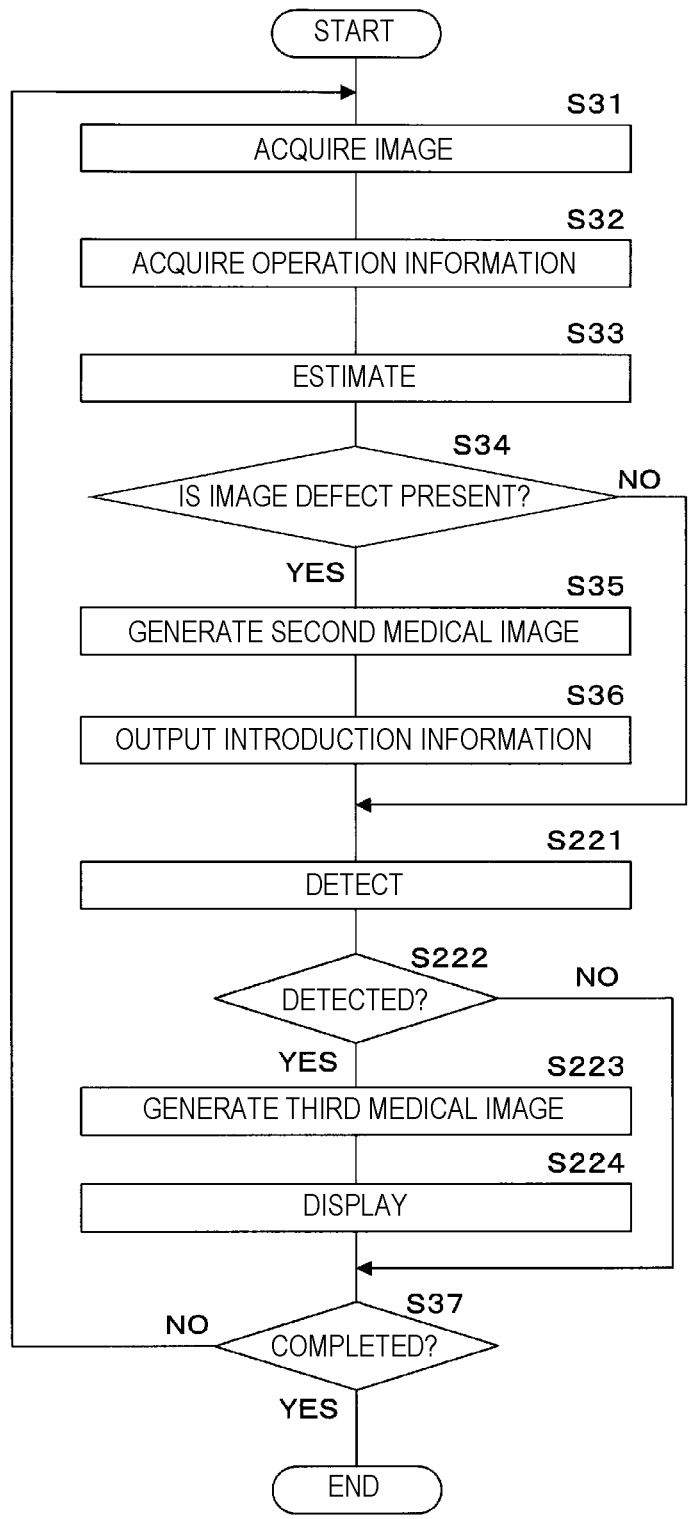
FIG. 14 is a flowchart showing a procedure for image defect estimation and artifact detection.

FIG. 14 is a flowchart showing a procedure for image defect estimation and artifact detection. Note that the same steps or processes as those in the flowchart of FIG. 8 are denoted by the same reference numerals, and description of the steps or processes will be omitted.

The control unit 11 of the server 1 performs the following processing when it is determined to be NO in S34 or after the processing of S36 is performed. The control unit 11 inputs the medical image acquired from the diagnostic imaging apparatus 2 to the detection model 142, and detects the artifact region (S221). Specifically, as described above, the control unit 11 detects the coordinate range of the artifact region and the type of the artifact.

The control unit 11 determines whether the artifact region is detected as a result of the processing at S221 (S222). When it is determined that the artifact region is detected (YES in S222), the control unit 11 generates the third medical image in which the display mode of the artifact region is changed according to the type of the artifact (S223). The control unit 11 outputs the generated third medical image to the diagnostic imaging apparatus 2 and causes the diagnostic imaging apparatus 2 to display the third medical image (S224). When it is determined to be NO in S222 or after the processing of S224 is performed, the control unit 11 shifts the processing to S37.

Note that the estimation model 141 and the detection model 142 are described as separate models in the above description, but may be the same model.

As for the detection model 142, similarly to the estimation model 141, a correction input of the detection result may be received, and a medical image obtained by labeling the corrected detection result (the coordinate range and the type of the artifact region) may be given to the detection model 142 as the training data to perform relearning.

As described above, according to the second embodiment, not only the estimation of the image defect but also the detection of the artifact can be performed at the same time.

Third Embodiment

The second embodiment describes an aspect in which an artifact region is detected using the detection model 142. In the present embodiment, an aspect in which a predetermined object in a body lumen to be examined is detected from a medical image in addition to an artifact will be described.

Figure 15:
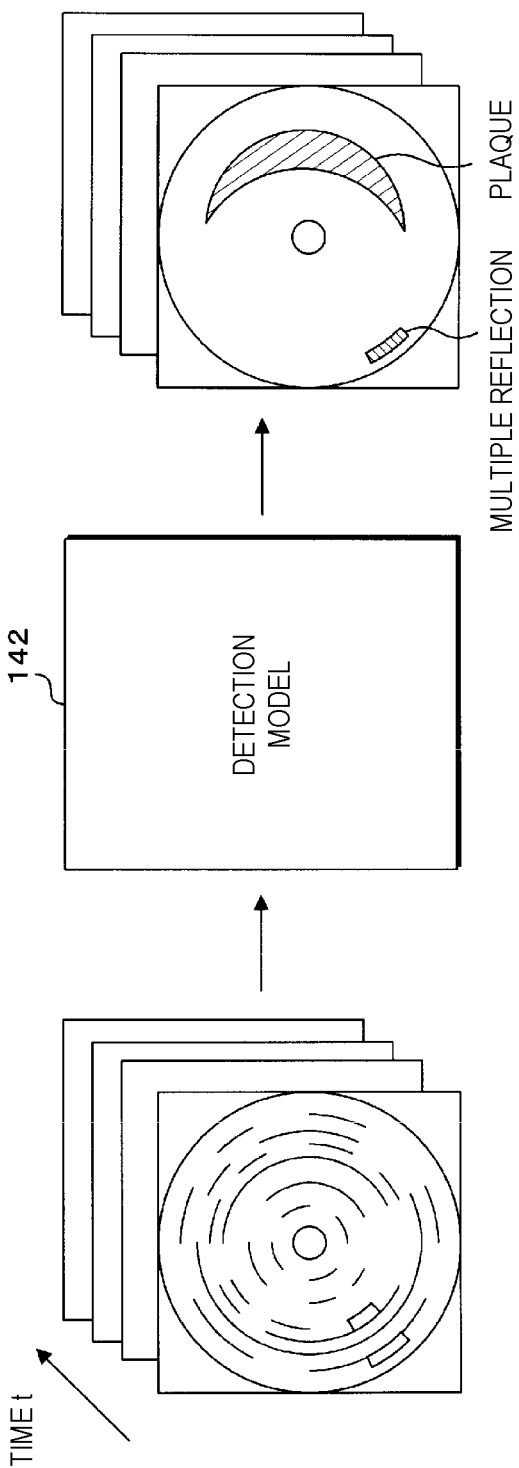
FIG. 15 is an explanatory diagram of a detection model according to a third embodiment.

FIG. 15 is an explanatory diagram of the detection model 142 according to a third embodiment. In the present embodiment, the server 1 learns training data in which a medical image for training is labeled with data indicating an image region of the object to be examined (hereinafter, referred to as an "object region") other than an artifact region, and generates the detection model 142. The object can be an object in a blood vessel (body lumen) to be diagnosed or treated, and can be, for example, a plaque or the like.

Note that the object is not limited to a biological tissue present in the blood vessel, and may be a substance other than the biological tissue, such as a stent indwelled in the blood vessel of a subject (patient).

In the training data, in addition to artifact data (a coordinate range of the artifact region and a type of an artifact) or instead of the artifact data, data relating to the object is given to the medical image for training. Specifically, as shown on a right side of the detection model 142, the data indicating the coordinate range of the artifact region and the type of the artifact is labeled when the artifact is present in the image, and data indicating a coordinate range of the object region and a type of the object is labeled when the object is present.

The server 1 generates the detection model 142 based on the training data. Since the present embodiment is the same as the first embodiment except that the object region is added, a detailed description of the detection model 142 will be omitted in the present embodiment. When the medical image is acquired from the diagnostic imaging apparatus 2, the server 1 inputs the medical image to the detection model 142, detects the artifact region and/or the object region, and outputs a detection result to the diagnostic imaging apparatus 2.

Figure 16:
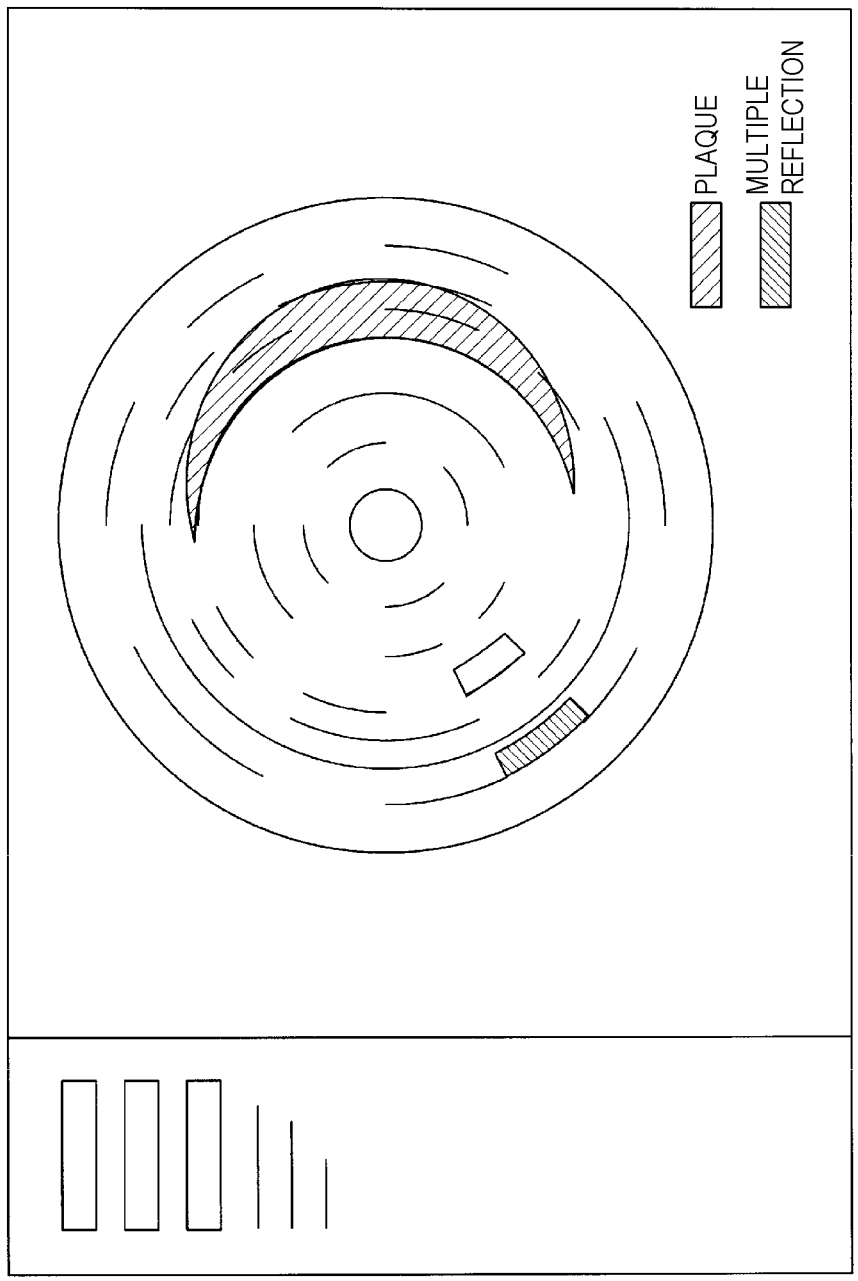
FIG. 16 is an explanatory diagram showing an example of a display screen of a diagnostic imaging apparatus according to the third embodiment.

FIG. 16 is an explanatory diagram showing an example of a display screen of the diagnostic imaging apparatus 2 according to the third embodiment. In the present embodiment, the diagnostic imaging apparatus 2 displays a third medical image indicating the object region other than the artifact region, and presents the third medical image to a user. When the server 1 detects the artifact region and the object region at the same time, the server 1 generates the third medical image in which a display mode (display color) of each region is changed, and causes the diagnostic imaging apparatus 2 to display the third medical image. Note that for example, the server 1 may determine a size or the like of the object based on a coordinate value of the object region and causes the diagnostic imaging apparatus 2 to display the determined size or the like together with the third medical image.

Figure 17:
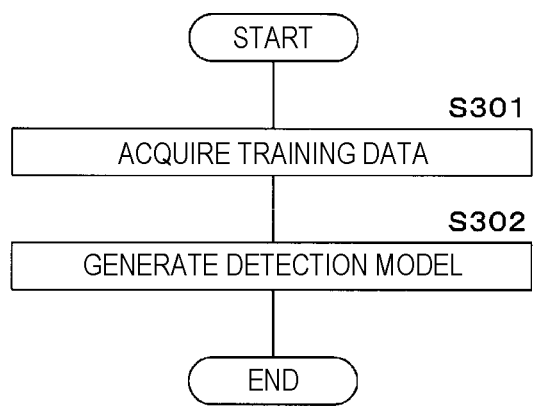
FIG. 17 is a flowchart showing a procedure for generating the detection model according to the third embodiment.

FIG. 17 is a flowchart showing a procedure for generating the detection model 142 according to the third embodiment.

The control unit 11 of the server 1 acquires the training data in which the medical image for training is labeled with the data related to the artifact region and/or the object region (S301). Based on the training data, the control unit 11 generates the detection model 142 that detects the artifact region and/or the object region when receiving the medical image (S302). The control unit 11 ends the series of processing.

Figure 18:
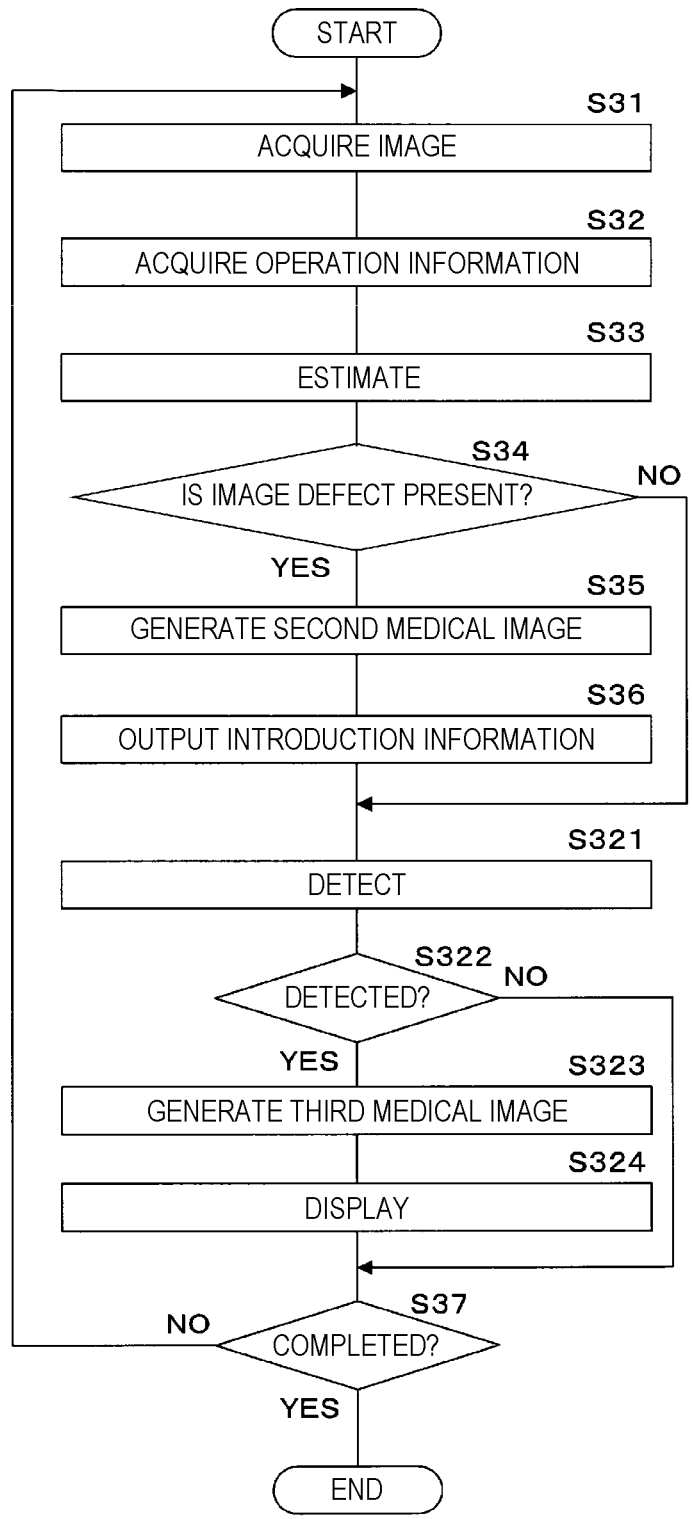
FIG. 18 is a flowchart showing a procedure of artifact and object detection.

FIG. 18 is a flowchart showing a procedure of artifact and object detection. Note that the same steps or processes as those in the flowchart of FIG. 14 are denoted by the same reference numerals, and description of the same steps or processes as shown in FIG. 14 will be omitted.

The control unit 11 of the server 1 performs the following processing when it is determined to be NO in S34 or after the processing of S36 is performed. The control unit 11 inputs the medical image acquired from the diagnostic imaging apparatus 2 to the detection model 142, and detects the artifact region and/or the object region in the medical image (S321).

The control unit 11 determines whether the artifact region and/or the object region is detected at S321 (S322). When it is determined that no artifact region and/or no object region is detected (NO in S322), the processing proceeds to S37.

When it is determined that the artifact region and/or the object region is detected (YES in S322), the control unit 11 generates the third medical image obtained by processing the artifact region and/or the object region (S323). The control unit 11 outputs the generated third medical image to the diagnostic imaging apparatus 2 and causes the diagnostic imaging apparatus 2 to display the introduction (S324). The control unit 11 shifts the processing to S37.

Note that although the artifact and the object are detected in the same detection model 142 in the above description, models for detecting the artifact and the object may be separately provided.

As described above, according to the third embodiment, the artifact and the object can be simultaneously detected from the medical image and presented to the user, and a desired object or an artifact can be identified.

Fourth Embodiment

The present embodiment describes that an image defect is estimated using a fluoroscopic image of a body lumen of a subject in addition to a medical image (tomographic image) generated based on a signal detected by a catheter.

Figure 19:
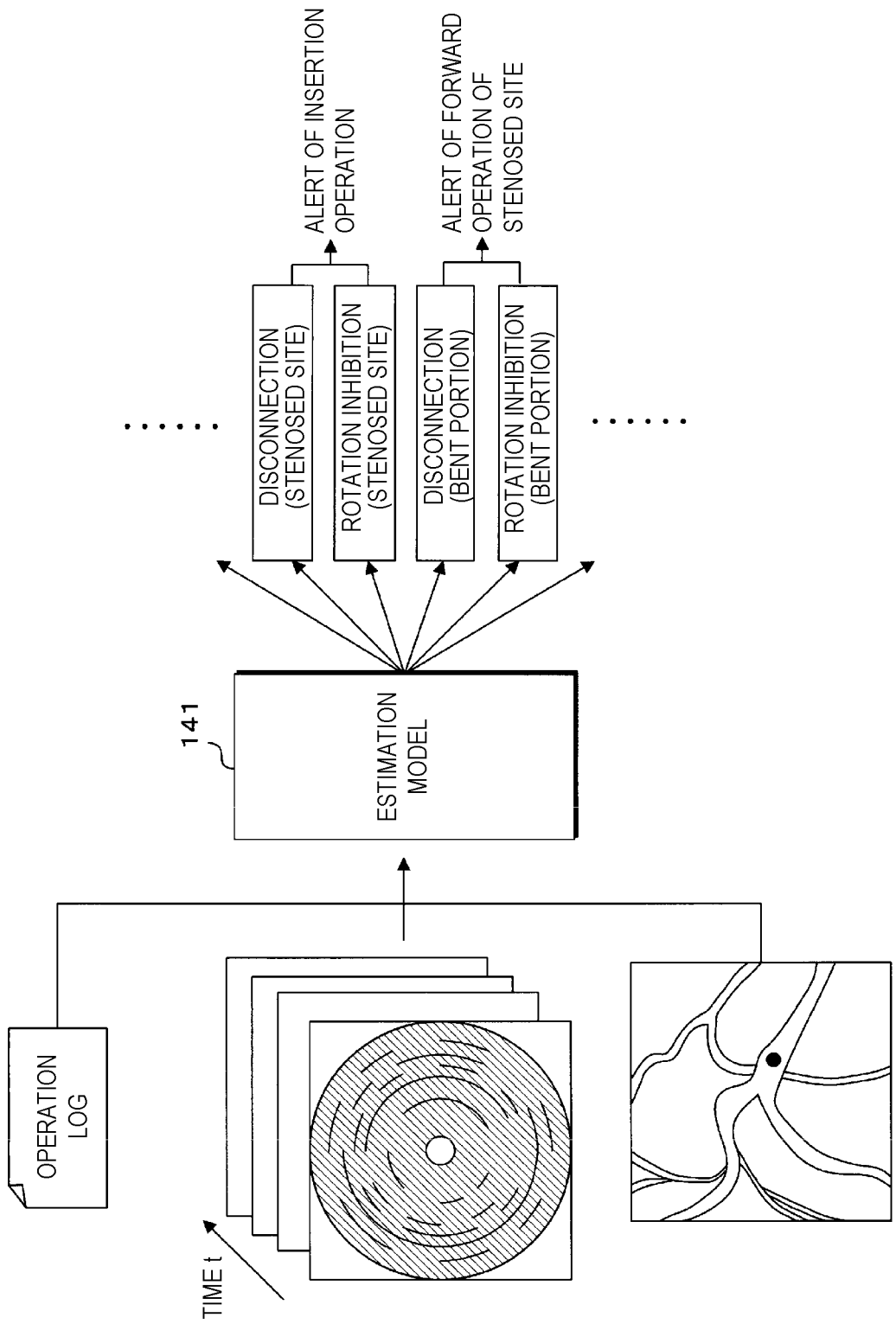
FIG. 19 is an explanatory diagram of an estimation model according to a fourth embodiment.

FIG. 19 is an explanatory diagram of the estimation model 141 according to a fourth embodiment. FIG. 19 conceptually shows a state in which, in addition to the medical image which is imaged by the diagnostic imaging apparatus 2 and operation information, the fluoroscopic image of the body lumen of the subject is input to the estimation model 141 to estimate a cause of the image defect. With reference to FIG. 19, an outline of the present embodiment will be described.

The fluoroscopic image is an image obtained by visualizing the body lumen of the subject by a method such as X-ray imaging, and is, for example, an angiogram generated by an angiography apparatus (not shown). Note that the fluoroscopic image is not limited to an angiogram as long as it is an image by which a user can identify the body lumen of the subject and the catheter 21 inserted into the body lumen.

When the subject receives an ultrasound examination by the catheter 21, the angiography is simultaneously performed by an angiography apparatus. For example, an X-ray opaque marker is attached to a distal end of the catheter 21, and an insertion position (a position of the distal end) of the catheter 21 can be identified by the fluoroscopic image. Note that in FIG. 19, the insertion position of the catheter 21 is indicated by a black circle.

The server 1 acquires the medical image of an inside of the body lumen (blood vessel) by the ultrasound examination from the diagnostic imaging apparatus 2, and acquires the fluoroscopic image of the body lumen from the angiography apparatus. The server 1 inputs both images to the estimation model 141, and estimates presence or absence and the cause of the image defect.

The server 1 acquires the presence or absence and the cause of image defect and the insertion position of the catheter 21 from the estimation model 141 as an output. In training data of the estimation model 141 according to the present embodiment, for example, the presence or absence and the cause of image defect and the insertion position of the catheter 21 are regarded as one label, and the label is given to the medical image for training of the diagnostic imaging apparatus 2, the operation information, and the fluoroscopic image of the angiography apparatus. The server 1 inputs the medical image for training, the operation information, and the fluoroscopic image to the estimation model 141, and performs learning so as to output a correct label.

Similarly to the first embodiment, the server 1 outputs introduction information according to the cause of the image defect estimated by the estimation model 141. Here, the server 1 outputs different pieces of the introduction information according to the estimated insertion position of the catheter 21 even if the cause of the image defect is the same. For example, as shown in FIG. 19, in a case in which it is estimated that a sign of a breakage (disconnection, rotation inhibition, or the like) in the catheter 21 is present, different alerts regarding a forward operation of the catheter 21 is output depending on whether the insertion position of the catheter 21 is a stenosed site of a blood vessel, a bent portion of the blood vessel, or the like. In this way, the server 1 outputs, as the introduction information, different operation methods according to the insertion position of the catheter 21.

Figure 20:
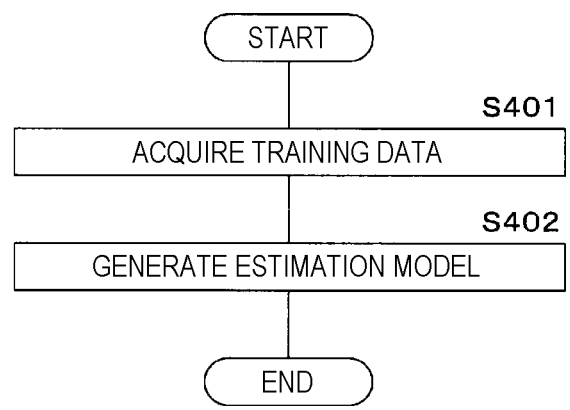
FIG. 20 is a flowchart showing a procedure for generating the estimation model according to the fourth embodiment.

FIG. 20 is a flowchart showing a procedure for generating the estimation model 141 according to the fourth embodiment.

The control unit 11 of the server 1 acquires the training data in which the medical image for training by the diagnostic imaging apparatus 2, the operation information, and the fluoroscopic image by the angiography apparatus are labeled with data indicating the presence or absence and cause of the image defect (S401). Specifically, as described above, the control unit 11 acquires the training data in which the data indicating the insertion position of the catheter 21 in addition to the presence or absence and the cause of image defect is given as the correct label.

Based on the training data, the control unit 11 generates the estimation model 141 that estimates the presence or absence and the cause of image defect when receiving the medical image generated using a catheter and the fluoroscopic image at a generation time point of the medical image (S402). Specifically, as described above, the control unit 11 generates the estimation model 141 that outputs the insertion position of the catheter 21 as an estimation result in addition to the presence or absence and the cause of image defect. The control unit 11 ends the series of processing.

Figure 21:
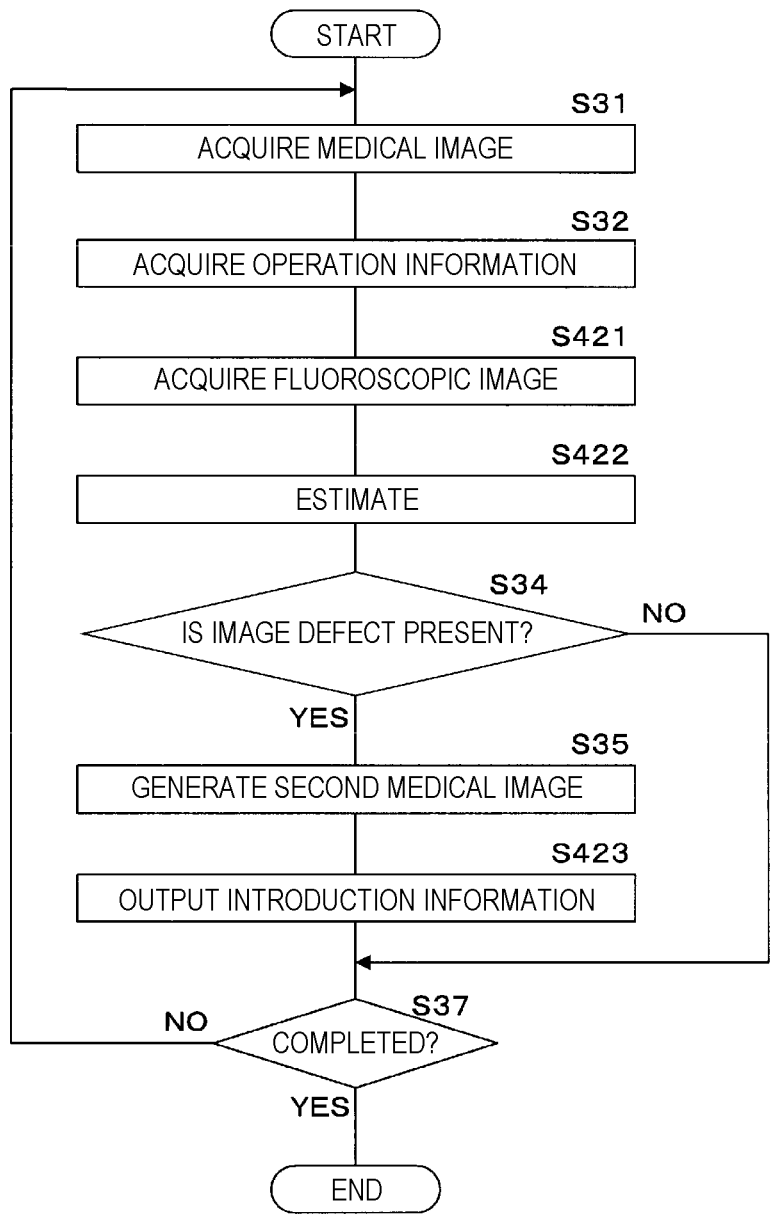
FIG. 21 is a flowchart showing a procedure for estimating an image defect according to the fourth embodiment.

FIG. 21 is a flowchart showing a procedure for estimating the image defect according to the fourth embodiment. The same steps or processes as those in the flowchart of FIG. 8 are denoted by the same reference numerals, and description of the same steps or processes in FIG. 8 will be omitted.

After the processing of S32 is performed, the control unit 11 of the server 1 performs the following processing. The control unit 11 acquires the fluoroscopic image of the body lumen of the subject from the angiography apparatus (S421). Then, the control unit 11 inputs the fluoroscopic image by the angiography apparatus to the estimation model 141 in addition to the medical image by the diagnostic imaging apparatus 2 and the operation information, and estimates the presence or absence and the cause of image defect and the insertion position of the catheter 21 (S422). The control unit 11 shifts the processing to S34.

After the processing of S35 is performed, the control unit 11 outputs the introduction information for removing the cause of the image defect (S423). Specifically, the control unit 11 outputs the introduction information according to the estimated cause of the image defect and the estimated insertion position of the catheter 21. For example, the control unit 11 outputs, as the introduction information, an alert related to different operations of the catheter 21 according to the insertion position. The control unit 11 shifts the processing to S37.

As described above, according to the fourth embodiment, a countermeasure can be suitably introduced in consideration of the insertion position of the catheter 21 by inputting the fluoroscopic image into the estimation model 141.

The detailed description above describes embodiments of a program, an information processing method, an information processing apparatus, and a model generation method. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A non-transitory computer-readable medium (CRM) storing computer program code executed by a computer processor that executes a process comprising:
   acquiring a medical image generated based on a signal detected by a catheter insertable into a body lumen;
   estimating a cause of an image defect by inputting the acquired medical image to a model learned to output the cause of the image defect when the medical image in which the image defect occurs is input;
   outputting introduction information for introducing a countermeasure for removing the estimated cause of the image defect;
   acquiring operation information on a diagnostic imaging apparatus to which the catheter is connected;
   determining whether a generation time point of the medical image is before an examination based on the operation information; and
   estimating the cause of the image defect by inputting, to the model, the medical image and a determination result as to whether the generation time point of the medical image is before the examination.

2. The computer-readable medium according to claim 1, further comprising:
   acquiring a plurality of the medical images generated along a longitudinal direction of the body lumen; and
   estimating the cause of the image defect by inputting the plurality of medical images to the model.

3. The computer-readable medium according to claim 1, further comprising:
   reacquiring a medical image obtained after the countermeasure is performed when the introduction information is output; and
   performing re-estimation by inputting the reacquired medical image to the model.

4. A non-transitory computer-readable medium (CRM) storing computer program code executed by a computer processor that executes a process comprising:
   acquiring a medical image generated based on a signal detected by a catheter insertable into a body lumen;
   estimating a cause of an image defect by inputting the acquired medical image to a model learned to output the cause of the image defect when the medical image in which the image defect occurs is input;
   outputting introduction information for introducing a countermeasure for removing the estimated cause of the image defect;
   generating the acquired medical image in a state in which the catheter is inserted into the body lumen; and
   detecting a sign of a breakage of the catheter by inputting the acquired medical image to the model.

5. The computer-readable medium according to claim 4, wherein, when the sign of the breakage is detected, further comprising:
   outputting the output introduction information indicating an operation method of the catheter for avoiding the breakage.

6. The computer-readable medium according to claim 4, wherein, when the sign of the breakage is detected, further comprising:
   outputting the output introduction information prompting replacement of the catheter.

7. A non-transitory computer-readable medium (CRM) storing computer program code executed by a computer processor that executes a process comprising:
   acquiring a medical image generated based on a signal detected by a catheter insertable into a body lumen;
   estimating a cause of an image defect by inputting the acquired medical image to a model learned to output the cause of the image defect when the medical image in which the image defect occurs is input;
   outputting introduction information for introducing a countermeasure for removing the estimated cause of the image defect;
   generating the medical image in a state in which the catheter is inserted into the body lumen, and acquiring a fluoroscopic image of the body lumen at the generation time point of the medical image; and
   outputting the introduction information by estimating the cause of the image defect based on the medical image and the fluoroscopic image.

8. The computer-readable medium according to claim 7, further comprising:
   estimating an insertion position of the catheter based on the medical image and the fluoroscopic image; and
   outputting the output introduction information indicating the operation method of the catheter in accordance with the estimated cause of the image defect and the estimated insertion position.

9. The computer-readable medium according to claim 1, further comprising:
   receiving a correction input for correcting an estimation result based on the model after the introduction information is output; and
   updating the model by performing relearning based on the estimated medical image and an estimation result obtained after the correction.

10. The computer-readable medium according to claim 1, further comprising:
    detecting an image region corresponding to an artifact in the medical image by inputting the acquired medical image to a model learned to output a detection result obtained by detecting the image region corresponding to the artifact when the medical image is input; and
    outputting the detection result in association with the medical image.

11. The computer-readable medium according to claim 1, further comprising:

detecting an image region corresponding to an object to be examined in the medical image by inputting the acquired medical image to a model learned to output a detection result obtained by detecting the image region corresponding to the object when the medical image is input; and outputting the detection result in association with the medical image.

\* \* \* \* \*